US008722957B2

(12) United States Patent  
Nzengung

(10) Patent No.: US 8,722,957 B2  
(45) Date of Patent: May 13, 2014

(54) SULFUR-BASED BULK REDUCTANTS AND METHODS OF USING SAME

(75) Inventor: Valentine A. Nzengung, Watkinsville, GA (US)

(73) Assignee: University of Georgia Research Foundation, Inc., Athens, GA (US)

(*) Notice: Subject to any disclaimer, the term of this patent is extended or adjusted under 35 U.S.C. 154(b) by 691 days.

(21) Appl. No.: 12/599,098

(22) PCT Filed: May 9, 2008

(86) PCT No.: PCT/US2008/063249
§ 371 (c)(1),
(2), (4) Date: Aug. 5, 2010

(87) PCT Pub. No.: WO2008/147669
PCT Pub. Date: Dec. 4, 2008

(65) Prior Publication Data
US 2010/0310316 A1  Dec. 9, 2010

Related U.S. Application Data

(60) Provisional application No. 60/928,590, filed on May 10, 2007.

(51) Int. Cl.
B09C 1/00 (2006.01)
(52) U.S. Cl.
USPC .............. 588/319; 405/128.1; 405/128.5
(58) Field of Classification Search
USPC ............ 405/128.1, 128.5, 128.75; 588/319
See application file for complete search history.

(56) References Cited

U.S. PATENT DOCUMENTS

| 2,669,584 | A | * | 2/1954 | Lowe | 564/416 |
| 3,981,965 | A | | 9/1976 | Gancy et al. | |
| 5,032,291 | A | * | 7/1991 | Sublette | 210/757 |
| 5,122,279 | A | | 6/1992 | Guess | |
| 5,397,478 | A | | 3/1995 | Pal et al. | |

(Continued)

FOREIGN PATENT DOCUMENTS

DE  103 06 621 A1  11/2003
EP  1 593 729 A1  11/2005

(Continued)

OTHER PUBLICATIONS 2,4,6-Trinitrotoluene (TNT) (CASRN 118-96-7). USEPA Website. Retrieved from the Internet on Nov. 1, 2012. Retrieved from http://www.epa.gov/iris/subst/0269.htm 11 pages.

(Continued)

Primary Examiner — John Kreck
(74) Attorney, Agent, or Firm — Mueting, Raasch & Gebhardt, P.A.

(57) ABSTRACT

Provided herein are methods of treating a composition. In one embodiment, the method includes contacting a sulfur-based bulk reductant with a composition that includes soil and/or water and further includes one or more oxidized organic and/or inorganic compounds. In another embodiment, the method includes contacting a sulfur-based bulk reductant with a composition that includes soil and/or water and further includes one or more chlorinated organic compounds. In still another embodiment, the method includes contacting a sulfur-based bulk reductant with a composition that includes soil and/or water and further includes one or more chemical warfare agents. Also provided herein are sulfur-based bulk reductants for use in remediation of contaminated soil and/or water.

33 Claims, 12 Drawing Sheets

(56) References Cited

U.S. PATENT DOCUMENTS

| | | | |
|---|---|---|---|
| 5,403,450 | A | 4/1995 | Mellor et al. |
| 5,455,173 | A | 10/1995 | Crawford et al. |
| 5,783,088 | A | 7/1998 | Amonette et al. |
| 6,039,882 | A | 3/2000 | Wolfe et al. |
| 6,068,777 | A | 5/2000 | Kimura et al. |
| 6,207,073 | B1 | 3/2001 | Wolfe et al. |
| 6,280,759 | B1 | 8/2001 | Price et al. |
| 6,533,943 | B1 | 3/2003 | Jones et al. |
| 7,056,061 | B2* | 6/2006 | Kukor et al. ............. 405/128.75 |
| 7,214,509 | B2 | 5/2007 | Schnoor et al. |
| 2002/0131924 | A1 | 9/2002 | Heuser et al. |
| 2005/0077242 | A1* | 4/2005 | Karlsson ................ 210/638 |
| 2006/0246555 | A1 | 11/2006 | Hawari |
| 2007/0088188 | A1 | 4/2007 | Wazne et al. |

FOREIGN PATENT DOCUMENTS

| | | |
|---|---|---|
| JP | 61 021784 | 1/1986 |
| JP | 2004 359726 | 12/2004 |
| WO | WO 94/14479 A1 | 7/1994 |
| WO | WO 94/27917 A | 12/1994 |

OTHER PUBLICATIONS

Agrawal et al. "Reduction of Nitro Aromatic Compounds by Zero-Valent Iron Metal". 1995. *Environ. Sci. Technol.* 30(1):153-160.

Amonette et al. "Creation of a Subsurface Permeable Treatment Barrier Using In-Situ Redox Manipulation" 1997 International Containment Technology Conference and Exhibition. Feb. 9-12, 1997. St. Petersburg, FL. 704-710 CONF-970208-Proc. DE98001967, 1997. Abstract Only.

Bruns-Nagel et al. "Identification of Oxidized TNT Metabolites in Soil Samples of a Former Ammunition Plant" 1999. *Environ. Sci. & Pollut. Res.* 6(1):7-10.

D'Agostino and Chenier, "Analysis of Chemical Warfare Agents: General Overview, LC-Ms Review, In-House LC-ESI-MS Methods and Open Literature Bibliography," *Defence Research and Development Canada*, Technical Report DRDC Suffield TR 2006-22, Mar. 2006; 91 pgs.

Elovitz et al. "Sediment-Mediated Reduction of 2,4,6-Trinitrotoluene and Fate of the Resulting Aromatic (Poly)amines". 1999. *Environ. Sci. Technol.* 33(15):2617-2625.

EPA Method 8095. Explosives by Gas Chromatography. Feb. 2007. Pgs. 8095-1 to 8095-27.

Gan et al. "Reduction of Structural Iron in Ferrunginous Smectite by Free Radicals" 1992. *Clays and Clay Minerals.* 40(6):659-665.

Gillham et al. "Enhanced Degradationof Halogenated Aliphatics by Zero-Valent Iron" 1994. *Ground Water.* 32(6):958-967.

Hundal et al. "Removal of TNT and RDX from water and soil using iron metal". 1997. *Environ. Pollut.* 97(1-2):55-64.

Hwang et al. "Applicability of alkaline hydrolysis for remediation of TNT-contaminated water". 2005. *Water Research.* 39:4503-4511.

International Search Report and Written Opinion dated Feb. 6, 2009 from related International Patent Application No. PCT/US2008/063249; 15 pages.

Nail, Jason D. Thesis. 2009. "Dithionite Mediated Degradation of 2,4,6-Trinitrotolune in Soils from a Former Department of Defense Ammunition Plant". 105 pages.

Nzengung et al., "Abiotic Transformation of Perchloroethylene in Homogeneous Dithionite Soluytion and in Suspensions of Dithionite-Treated Clay Materials," *Environ Sci Technol.*, 2001;35:2244-2251.

Nzengung et al. "Transformation of Trichloroethylene (TCE) and Perchloroethylene (PCE) at the Surface of Dithionite Reduced Clay Minerals and Iron Oxides". 217th American Chemical Society National Meeting. Anaheim, Ca. Mar. 21-25, 1999. Abstract Only.

Payne, David, "Chemically Induced Reductive Dechlorination of Chlorinated Aliphatics," 217th American Chemical Society National Meeting, Anaheim, CA. Mar. 21-25, 1999. 57 pages.

Price et al. "Effect of Redox Potential and pH on TNT Transformation in Soil-Water Slurries". 1997. *J. Environ. Eng.* 123(10):988-992.

Rinker et al. "Kinetics and Mechanism of the Theiinal Decomposition of Sodium Dithionite in Aqueous Solution" 1965. *I & EC Fundamentals.* 4:282-287.

"Sodium Sheet, Hydrosulfite Solution," *ChemTrade Logistics, Material Safety Data Sheet*, Revision 2, North York, Ontario, Canada, Revised Mar. 22, 2007; 11 pgs.

"Sodium Hydrosulfite Powders & Blends," *ChemTrade Logistics, Material Safety Data Sheet*, Revision 3, North York, Ontario, Canada, Revised Jun. 25, 2007; 13 pgs.

Stenuit et al. "Promising strategies for the mineralisationof 2,4,6-trinitrotoluene". 2005. *Reviews in Environ. Sci. And Bio/Technology.* 4:39-60.

Szecsody et al., "Feasibility of In Situ Redox Manipulation of Subsurface Sediments for RDX Remediation of Pantex," *Pacific Northwest National Laboratory*—U.S. Department of Energy under contract DE-AC06-76RL01830, PNNL-13746, Dec. 2001.

Uddin, M.L. Organized papers of Uddin, "Laboratory Studies of in Situ Redox manipulation for remediation of PCE, TCE and Cr(VI) contaminated groundwater in Atlantic Coastal Plain sediments," Symposia Papers presented before the Division of Environmental Chemistry, *American Chemical Society*, San Diego, CA; Apr. 1-5, 2001;41(1):301-306.

Amonette et al. "Abiotic Reduction of Aquifer Materials by Dithionite: a Promising In-Situ Remediation Technology" Thirty-Third Hanford Symposium on Health and the Environment. Nov. 7-11, 1994. Pasco, WA. pp. 851-881.

EPA Method 8330A. Nitroaromatics and Nitramines by High Performance Liquid Chromatography (HPLC). Revision 1. Feb. 2007. 28 pages.

Method 8330B. Nitroaromatics, Nitramines, and Nitrate Esters by High Performance Liquid Chromatography (HPLC). Revision 2. Oct. 2006. 29 pages.

Redemann et al. "5-Amino-2,3-Dihydro-1,4-Phthalazinedione" 1949. *Organic Syntheses, Coll.* vol. 3, p. 69(1995); vol. 29, p. 8 (1949). 3 pages.

Sodium Dithionite. Product Data Sheet. 1995-2000 by Marudai Balasubramanian & James G. Keay. Reilly Industries, Indianapolis, IN, USA. 8 pages.

Sodium Hydrosulfite (Sodium Dithionite). Description. Great Vista Chemicals. Retrieved from the Internet on Dec. 17, 2013. Retrieved from http://www.greatvistachemicals.com/industrial_and_specialty_chemicals/sodium-hydrosulfite-dithionite.html . 2 pages.

Yang et al. "A Versatile Method for the Synthesis of Benzimidazoles from o-Nitroanilines and Aldehydes in One Step via a Reductive Cyclization". 2005. *Synthesis.* 1:0047-0056.

\* cited by examiner

US 8,722,957 B2

SULFUR-BASED BULK REDUCTANTS AND METHODS OF USING SAME

This application is the §371 U.S. National Stage of International Application No. PCT/US2008/063249, filed May 9, 2008, published in the English language on Dec. 4, 2008 as International Publication No. WO 2008/147669, which claims the benefit of U.S. Provisional Application Ser. No. 60/928,590, filed on May 10, 2007, all of which are incorporated herein by reference in their entireties.

BACKGROUND

Some compounds may contaminate a composition (e.g., soil and/or water). Energetic compounds and/or explosive materials (e.g. 2,4,6-trinitrotoluene or "TNT") may be present in, for example, soil and/or water as a result of for example, munitions manufacturing, testing, deployment, and/or disposal. In high enough concentrations, such compounds may pose environmental risks or health risks. Such risks may be mitigated through remediation methods to reduce the concentrations of such compounds.

Various known remediation methods may be disadvantageous for various reasons, among them high capital cost, high amount of labor required, high amount of time required for remediation, and others.

Therefore, new methods of treating contaminated compositions (e.g., soil and/or water) are sought.

SUMMARY

In one aspect of the present disclosure, a method of treating a composition (e.g., soil and/or water) is provided. The method includes contacting a sulfur-based bulk reductant with a composition including: one or more oxidized organic and/or inorganic compounds; and soil and/or water. In one or more embodiments, the method may be a remediation method for removing contaminants from and/or transforming contaminants in soil and/or water.

In another aspect of the present disclosure, a sulfur-based bulk reductant for use in remediation of contaminated soil and/or water is provided. The sulfur-based bulk reductant may include sodium dithionite and a controlled-release agent.

In another aspect of the present disclosure, a sulfur-based bulk reductant for use in remediation of contaminated soil and/or water is provided that includes an aqueous solution of at least 10 mM dithionite buffered to a pH of at least 7.

In another aspect of the present disclosure, a method of treating a composition is provided, the method including contacting a sulfur-based bulk reductant with a composition including: one or more chlorinated organic compounds; and soil and/or water.

In another aspect of the present disclosure, a method of treating a composition is provided, the method including contacting a sulfur-based bulk reductant with a composition including: one or more chemical warfare agents; and soil and/or water.

As used herein, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "or" is generally employed in its sense including "and/or" unless the content clearly dictates otherwise.

The term "and/or" means one or all of the listed elements or a combination of any two or more of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

The above brief description of various embodiments of the present invention is not intended to describe each embodiment or every implementation of the present invention. Rather, a more complete understanding of the invention will become apparent and appreciated by reference to the following description and claims in view of the accompanying drawings. Further, it is to be understood that other embodiments may be utilized and structural changes may be made without departing from the scope of the present invention. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
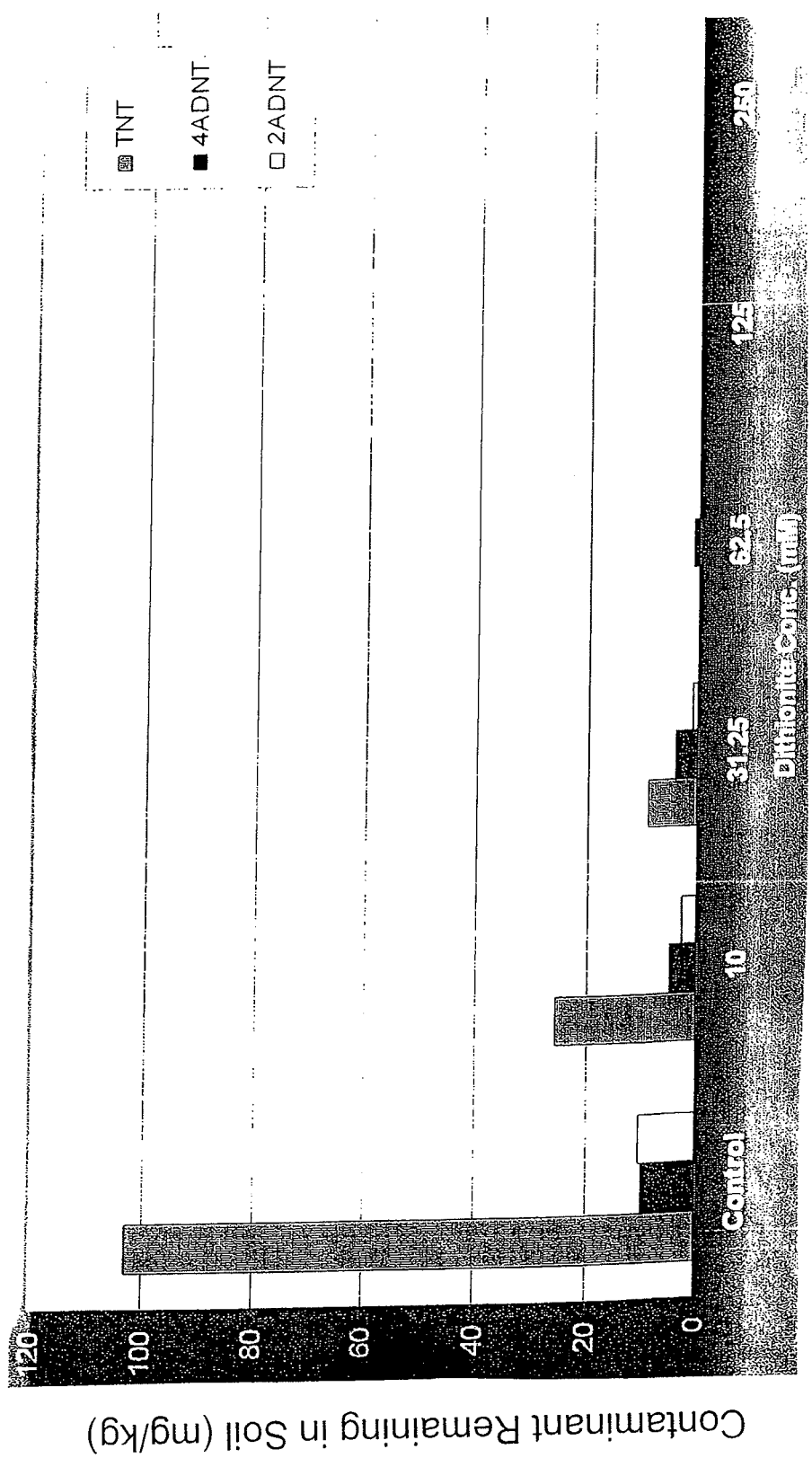
FIG. 1 shows concentrations of 2,4,6-trinitrotoluene (TNT), 4-amino-2,6-dinitrotoluene (4-ADNT), and 2-amino-4,6-dinitrotoluene (2-ADNT) in dithionite-treated soil for various concentrations of dithionite in a sulfur-based bulk reductant, as described in Example 1.

Many oxidized organic compounds, such as 2,4,6-trinitrotoluene (TNT), have been used as components in military weapons ordnances and other products. Such compounds may be present as contaminants in soil and/or water as a result of, for example, manufacturing, testing, deployment, and/or disposal of such ordnance or components thereof, as well as other processes. TNT has been identified as a possible carcinogen by the United States Environmental Protection Agency and a "contaminant of concern." TNT is also acutely toxic to some organisms, such as fish, earthworms, and/or bacteria. The United States Environmental Protection Agency (EPA) has established standards regarding exposure to some compounds, such as TNT. For TNT, the EPA has established a remediation goal of 17.2 mg/kg (milligrams per kilogram) in soil and has established a cancer risk screening value of 20 mg/kg (milligrams per kilogram) for chronic doses. The EPA groundwater health advisory levels for TNT are 2 µg/L (micrograms per liter) (lifetime) and 20 µg/L (micrograms per liter) (one-time). Therefore, where oxidized organic compounds are present in a composition (e.g., soil and/or water), treatment methods may be used to reduce or eliminate the concentration of oxidized organic compounds in the composition.

Provided herein are methods of treating a composition (e.g., soil and/or water) that includes one or more oxidized compounds (e.g., nitroaromatics). The methods include contacting a sulfur-based bulk reductant (e.g., dithionite) with the composition having one or more oxidized compounds in order to reduce the concentration of the one or more oxidized compounds. The sulfur-based bulk reductant may chemically reduce and/or transform the one or more oxidized compounds. Providing an effective amount of sulfur-based bulk reductant may, in certain embodiments, reduce the concentration of the one or more oxidized compounds in the composition to below environmental standards and/or below the detection limit.

The methods and sulfur-based bulk reductants provided herein may be used to treat a composition (e.g., soil and/or water) that includes oxidized compounds that are organic, inorganic, or combinations of oxidized organic compounds and oxidized inorganic compounds. In some embodiments, the methods and sulfur-based bulk reductants provided herein may be used to treat a composition that includes, for example, chlorinated organic compounds or chemical warfare agents.

In one or more embodiments, oxidized organic and/or inorganic compounds are contaminants in soil and/or water. As used herein, "contaminant" means a compound that is considered a pollutant, contaminant of concern, and/or a carcinogen by the U.S. Environmental Protection Agency. In the present disclosure such contaminants include, but are not limited to, TNT (2,4,6-trinitrotoluene), RDX (Royal demolition explosive; hexahydro-1,3,5-trinitro-1,3,5-triazine), HMX (high melting point explosive; octahydro-1,3,5,7-tetranitro-1,3,5,7-tetrazocine), TNP (picric acid; 2,4,6-trinitrophenol), TATNB (triamino-trinitrobenzene), DNTs (dinitrotoluenes), tetryl (nitramine, tetralite, or tetril; 2,4,6-trinitrophenyl-N-methylnitramine), and other organic and/or inorganic compounds as described herein. In the present disclosure, contaminants may also include, but are not limited to, chlorinated organic compounds (e.g., polychlorinated biphenyls and DDT) and/or chemical warfare agents, as described herein. As used herein, a "contaminated composition" includes: one or more contaminants; and soil and/or water.

In one or more embodiments, the contaminated composition to be treated may include soil and/or water. In the present disclosure, "soil" is meant to include any type of materials generally associated with the land, including, but not limited to, any dirt, earth, clay, sand, silt, sediment, and other media that are present in land or extracted therefrom, including materials at surface of land and materials thereunder. In the present disclosure, "water" is meant to include, but is not limited to, any water that may be present above or below the surface of land, including water or moisture that may be mixed in soil or other land materials, or any water extracted therefrom.

Oxidized organic compounds (e.g., oxidized aliphatic or aromatic compounds) may include one or more nitro (i.e., $-NO_2$) groups. In some embodiments, the one or more oxidized organic compounds may be octahydro-1,3,5,7-tetranitro-1,3,5,7-tetrazocine (HMX), 2,4,6-trinitrotoluene (TNT), 1,3,5-trinitro-1,3,5-triazine (RDX), trinitrobenzenes (TNB), nitrobenzene, nitrocellulose, nitroglycerin, nitromethane, aminodinitrotoluenes (ADNTs), diaminonitrotoluenes (DANTs), 2,4,6-trinitrophenol (TNP), triamino-trinitrobenzene (TATNB), dinitrotoluenes (DNTs), 2,4,6-trinitrophenyl-N-methylnitramine, and combinations thereof.

In one or more embodiments, oxidized organic compounds include energetic compounds (i.e., propellants, fuels, etc.) and/or explosives. Energetic compounds and/or explosives are compounds that may, under certain conditions, explode upon application of heat and/or shock. For example, an explosive (e.g., TNT) may be characterized by chemical stability, but may be made to undergo rapid chemical change, whereupon it may produce a large quantity of energy. Such oxidized organic compounds may be present in soil and/or water where, for example, munitions are tested, deployed (e.g., battlefields), stored, and/or disassembled. Such oxidized organic compounds may also be present in soil and/or water near munitions manufacturing facilities. Further, unexploded ordnance (UXO) devices may contain oxidized organic compounds (e.g., energetic compounds and/or explosives) and may be located on or in soil (i.e., on or in earth) and/or water (e.g., salt water). Some UXO devices may be underwater unexploded ordnance (UWUXO) devices that contain energetic compounds and/or explosives and may be located in artificial or natural bodies of water (e.g., rivers, lakes, oceans, etc.). Such UWUXO devices and other munitions may have, for example, cracked or ruptured and may be treated by the methods and sulfur-based bulk reductants of the present disclosure.

When the contaminated composition to be treated includes oxidized organic compounds (e.g., nitroaromatics), treatment of the composition involves reducing the concentration of the oxidized organic compounds in the composition. In one or more embodiments, the sulfur-based bulk reductant may chemically reduce one or more functional groups in the oxidized organic compounds (e.g., chemically reduce a nitro group to an amine group), thereby producing intermediate reduced compounds. In some embodiments, when the oxidized organic compound is an aromatic compound (e.g., nitroaromatic compounds), the sulfur-based bulk reductant may cleave an aromatic ring.

Methods of the present disclosure may decrease the concentrations of one or more oxidized organic and/or inorganic compounds. In one or more embodiments, the concentration of one or more oxidized organic compounds may be reduced to below United States Environmental Protection Agency (EPA) standards (or other local environmental standards), and in certain embodiments may be reduced to below detection limits.

Some explosives (e.g., TNT) are highly electron deficient and highly oxidized. Such compounds may have a high affinity for sorption to soil materials and may be highly recalcitrant (i.e., resistant to degradation in absence of remediation). Also, for example, the aqueous solubility of TNT is approximately 100-150 mg/L (milligram per liter) at 25° C. and decreases with chemical reduction of nitro groups. In one or more embodiments, TNT may be degraded in anaerobic and aerobic environments, as well as abiotically degraded. However, the biotic transformation of TNT is relatively slow, taking weeks, as opposed to hours in some abiotic degradation processes. TNT is also susceptible to, for example, photolytic degradation. However, in one or more embodiments, reductive degradation of an oxidized organic compound (e.g., TNT) may be rapid and may lead to mineralization or substantial mineralization of the oxidized organic compound. As used herein, a compound that is "mineralized" or "mineralization" of a compound means that a compound has been completely transformed to, for example, $CO_2$, $H_2O$, and one or more mineral forms of nitrogen, e.g., $NO_x$, or $NH_4$. The term "substantially mineralized" means that at least 10 wt-% (weight percent) (e.g., at least 20 wt-%, at least 30 wt-%, at least wt-50%, at least wt-70%, at least wt-80%, at least wt-90%, at least wt-95%, or at least 99 wt-%) of a given amount of a compound is mineralized.

In one or more embodiments, one or more oxidized organic compounds may be transformed to one or more non-nitrosated compounds. A non-nitrosated compound is a compound that does not include a monovalent nitroso group (—N=O). Nitrosated compounds include at least one monovalent nitroso group. For example, hydrogen sulfide may degrade RDX to form, for example, nitrite and formaldehyde, instead of the potentially toxic nitrosated byproducts of RDX, such as mononitroso-RDX (MNX), dinitroso-RDX (DNX), and trinitroso-RDX (TNX), that may be generated by, for example, bioremediation techniques and/or iron reduction techniques.

Because one or more oxidized organic compounds (e.g., TNT) may have a high affinity for sorption to soil minerals and organic matter, the highest concentration of one or more oxidized organic compounds (e.g., TNT) in a contaminated composition (e.g., soil), may be near the surface of the composition. Contamination of surface soils may be a potential continuous source of groundwater contamination, due to phase transfer and transport of oxidized organic compounds to groundwater. As used herein, "phase transfer" means transfer of contaminants (e.g., oxidized organic and/or inorganic compounds) from a solid composition (e.g., soil) to a liquid composition (e.g., water). One or more oxidized organic compounds (e.g., TNT) may be relatively slowly and incompletely transformed through biotic and/or abiotic processes, yielding ADNT isomeric products that may be found in association with TNT contamination. In one or more embodiments, contaminated compositions (e.g., soil) include, but are not limited to, aged, contaminated compositions. As used herein, "aging" refers to prolonged equilibration of one or more contaminants in soil and/or sediment. For example, prolonged equilibration of, for example, TNT in soil may result in TNT transformation, yielding ADNT isomeric products.

Treatment of a composition having TNT may result in TNT degradation products. Reaction intermediates, such as 2-ADNT and 4-ADNT, may be detected if treatments are conducted under conditions not effective for the degradation reactions. Degradation of TNT may result in ring cleavage, which would result in formation of lower molecular weight degradation products, such as formate and nitrate.

The process of chemically reducing, for example, TNT, is believed to be a step-wise process. Although not wishing to be bound by theory, the step-wise reductive degradation of TNT is believed to progress as a result of the transfer of electrons to nitro substituents and reduction from the nitro group to an amino group. Thereby, TNT transforms to 4-ADNT or 2-ADNT. A subsequent reduction of another nitro group transforms the ADNT compounds to either 2,4-DANT or 2,6-DANT. Such DANT compounds may covalently bind to sediment in an aerobic environment, or may form unknown transformation products in anaerobic conditions. Alternatively, such DANT compounds may be reduced further to triaminotoluene (TAT), which may covalently bind to sediment in an aerobic environment, or may form unknown transformation products in anaerobic conditions. TAT may sorb irreversibly to soils.

Methods of the present disclosure may lead to destructive transformation (e.g., ring cleavage) of one or more oxidized organic compounds, rather than simple phase transfer or off-site removal of such contaminants.

In one or more embodiments, a composition containing soil and/or water and oxidized inorganic compounds may be treated by contacting a sulfur-based bulk reductant with the composition. Oxidized inorganic compounds may include metals, such as metals selected from cadmium, chromium, iron, uranium, lead, plutonium, arsenic, technetium, mercury, zinc, and combinations thereof. For example, one or more oxidized inorganic compound may include chromium(VI). In certain embodiments, the reaction of oxidized inorganic compounds with the sulfur-based bulk reductant may form metal sulfide precipitates. In one or more embodiments, one or more oxidized inorganic compounds may include inorganic nitrate compounds, such as, for example, ammonium nitrate ($NH_4NO_3$).

In one or more embodiments, a sulfur-based bulk reductant is a material that is capable of treating a contaminated composition (e.g., soil and/or water) for removal or transformation of one or more oxidized organic and/or inorganic compounds by contact with the composition. Such a sulfur-based bulk reductant may include one or more reducing agents (e.g., sulfur-based reducing agent). In one or more embodiments, a sulfur-based bulk reductant is suitable for a wide variety of applications, including remediation of compositions wherein the oxidized organic and/or inorganic compounds are, for example, widespread and located on or below a soil surface (e.g., soil) and/or in water. In one or more embodiments of the present disclosure, a sulfur-based bulk reductant is contacted with a contaminated composition in a method to treat the composition. The sulfur-based bulk reductant may be alkaline (i.e., basic). In some embodiments, the sulfur-based bulk reductant is in the form of an aqueous solution, suspension, and/or dispersion of a reducing agent. Such aqueous solution, suspension, and/or dispersion of a reducing agent may be alkaline.

In certain embodiments, a sulfur-based bulk reductant may include a buffer. Such a buffer may be present in the sulfur-based bulk reductant in order to maintain a desired pH during the contacting. In some embodiments, a sulfur-based bulk reductant may be buffered to a pH of at least 7. In some embodiments, the contaminated composition to be treated may include salt water (e.g., sea water, brine, or brackish water), which may have a pH of, for example, approximately 8.

A wide variety of buffers may be used in the methods of the present disclosure, including, but not limited to, potassium-based, calcium-based, and sodium-based buffers. In the present disclosure, buffers may include strong bases of alkali metals and/or alkaline earth metals. In one or more embodiments, the buffer may include carbonate and/or bicarbonate. Such buffers may include calcium carbonate (lime), or other strong bases. Potassium-based buffers (e.g. $K_2CO_3/KHCO_3$) may be used, for example, when the contaminated composition (e.g., soil) to be treated contains clay. Treatment of contaminated clay materials can be challenging due to, for example, swelling of the clay upon treatment. Use of potassium-based buffers and/or calcium-based buffers (e.g., calcium carbonate) may reduce the swelling of the clay, resulting in, for example, more uniform application of the sulfur-based bulk reductant and therefore more uniform treatment of the soil. When clay is a significant component of the soil composition, a sodium-based buffer may not, in some embodiments, be as effective as a potassium-based buffer, due to promotion of the clay swelling by the sodium-based buffer and resultant changes to the hydraulic conductivity of the soil. Hydraulic conductivity is a measure of capacity of a porous medium (e.g., soil) to transmit a fluid (e.g., water) through a unit cross-sectional area. Affecting the hydraulic conductivity of the soil may result in, for example, non-uniform application of the sulfur-based bulk reductant to the composition having one or more contaminants (e.g., oxidized organic and/or inorganic compounds). In certain embodiments, the sulfur-based bulk reductant may be uniformly applied to a contaminated composition having one or more oxidized compounds. Uniform application of a sulfur-based bulk reductant may be aided in embodiments wherein contacting includes mixing the contaminated composition with the sulfur-based bulk reductant.

In certain embodiments, the concentration of buffers in the sulfur-based bulk reductant may be at least 0.001 molar, at least 0.01 molar, or at least 0.1 molar. In one or more embodiments, a sulfur-based bulk reductant in fresh water (i.e., not brackish or salt water) may include therein a weight ratio of buffers to reducing agents of between 3:1 and 5:1, and preferably 4:1. In other embodiments, a sulfur-based reductant in brackish or salt water may include therein a weight ratio of buffers to reducing agents of less than 4:1. In some embodiments, when using potassium carbonate and potassium bicarbonate, the concentrations of carbonate and bicarbonate may be 0.4 molar and 0.04 molar, respectively, when treating, for example, soils/sediment and water of low buffering capacity.

A sulfur-based bulk reductant includes at least one reducing agent capable of chemically reducing one or more oxidized organic and/or inorganic compounds under effective reaction conditions. Preferably, effective reaction conditions include a wide variety of reaction conditions in which a sulfur-based bulk reductant contacts a contaminated composition (soil and/or water). Effective reaction conditions include, but are not limited to, ambient conditions of the contaminated composition (e.g., soil and/or water) to be treated. Preferred reaction conditions include temperatures above the freezing point of water. Although effective reaction conditions include a wide range of pH, when the contaminated composition is water, preferred conditions include pH values greater than or equal to 8, which may, in some embodiments, be controlled with buffers. Although effective reaction conditions include aerobic, anaerobic, and anoxic environments, preferred reaction conditions include reduced oxygen concentrations because, for example, the amount of bulk reductant required may be reduced. Oxygen concentration in water can be reduced by, for example, bubbling carbon dioxide through the water or adding calcium metabisulfite to, for example, ground water. As used herein, a reducing agent means an element or compound in a reduction-oxidation reaction that reduces another element or compound in the reaction. The reducing agent donates an electron in the reaction and becomes oxidized. In one or more embodiments of the present disclosure, the reducing agent may be a sulfur-based reducing agent. Sulfur-based reducing agents may be selected, for example, from dithionite, calcium polysulfide, hydrogen sulfide ($H_2S$), and combinations thereof. In one or more embodiments wherein the sulfur-based bulk reductant includes hydrogen sulfide as a sulfur-based reducing agent, black carbon is preferably present when the sulfur-based bulk reductant contacts a contaminated composition. In some embodiments, black carbon may be naturally present in the contaminated composition (e.g., soil or sediment). In certain embodiments, black carbon may be added to the bulk reductant, the contaminated composition, or both.

As used herein, "dithionite" is an anion ($S_2O_4^{2-}$) that is a highly reactive reducing agent. Dissolving sodium dithionite ($Na_2S_2O_4$) in an aqueous solution may provide dithionite anions in solution. Sodium dithionite is commercially available from Sigma-Aldrich Company (St. Louis, Mo.) and other suppliers. Dithionite is highly unstable in aqueous solutions, decomposing to form two sulfoxyl ion radicals ($SO_2^-$.). The rate limiting step of reduction reactions with dithionite may be the decomposition of dithionite to produce the sulfoxyl ions. Once formed, the sulfoxyl free radical generally is short lived and highly reactive. For example, the active free radical i.e., $SO_2^-$. may bind to a mineral surface and transfer an electron to a sorbed or structural oxidized compound, thereby yielding sulfite ($SO_3^{2-}$) as a degradation product. Alternatively, a dithionite ion may undergo a disproportionation reaction that yields thiosulfate ($S_2O_3^{2-}$), and bisulfite ($HSO_3^-$), which may eventually oxidize to sulfate ($SO_4^{2-}$).

The decomposition of dithionite in aqueous solution can be pH dependent and can influence the reactivity of dithionite with oxidized organic compounds. The decomposition of dithionite in aqueous solution has been found to be faster at low pH (acidic) and slower at high pH (basic). Equation 1 shows that the disproportionation of dithionite at, for example, 60-80° C. generates one mole of protons per mole of dithionite at acidic pH:

$$4SO_2^-. \rightleftharpoons 2S_2O_4^{2-} + H_2O \rightarrow 2SO_3^{2-} + S_2O_3^{2-} + 2H^+ \quad (1)$$

At neutral and basic pH, an additional seven (7) moles of protons per mole of dithionite should be formed, if the oxidation of sulfite and thiosulfite occurred as follows:

$$2SO_3^{2-} + 2H_2O \rightleftharpoons 2SO_4^{2-} + 4e^- + 4H^+ \quad (2)$$

$$S_2O_3^{2-} + 5H_2O \rightleftharpoons 2SO_4^{2-} + 8e^- + 10H^+ \quad (3)$$

From Equations (1) through (3), the decomposition of dithionite to sulfate may provide the protons and electrons needed for reductive transformation reactions. Thus, effective transformation of oxidized organic compounds (e.g., explosive compounds) may be expected in buffered samples at pH greater than 7 (basic) than in the unbuffered samples at pH less than 7 (acidic). Changes of initial pH in buffered and unbuffered deoxygenated Savannah River Site aquifer material mixed with dithionite has been observed, which decreased from 8.5 to 8.2 and 6.2 to 3.03, respectively, as the proton activity in the solution increased with the homogeneous decomposition of dithionite.

In one or more embodiments of the present disclosure, a sulfur-based bulk reductant may include dithionite at a concentration of at least 10 mM (10 millimolar=0.01 molar), at least 30 mM, at least 50 mM, or higher concentrations. As used herein, the volume basis of molarity is the volume of water in which a solute (e.g., sulfur-based bulk reductant or buffer) is dissolved. For example, the volume of water in which a sulfur-based bulk reductant is dissolved includes the volume of water that may be present in the contaminated composition in addition to any additional water that may be added to the bulk reductant prior to or after contacting the contaminated composition. For example, in one or more embodiments in which the sulfur-based bulk reductant is contacting a contaminated composition such as water (e.g. a natural or artificial body of water, groundwater, etc.), the sulfur-based bulk reductant may be added as a solid (e.g., a powder) in such an amount that the contacted contaminated composition contains the desired concentration of sulfur-based bulk reductant.

One or more concentrations of the reducing agent in the sulfur-based bulk reductant may be useful for a particular treatment site based on the performance of such concentrations of the sulfur-based bulk reductant in bench-scale testing of samples from the treatment site. As used herein, a "treatment site" is a location having a relatively large contaminated area to be treated. A treatment site may be any size, without limitation, ranging from relatively small treatment sites (e.g., a "hot spot") to relatively large sites (e.g., munitions testing range or other widespread areas having contaminants) and may contain any concentration of contaminants (e.g., oxidized organic and/or inorganic compounds).

Another aspect of the present disclosure relates to a method of treating a contaminated composition in a treatment site. The method includes collecting one or more representative samples of contaminated composition (soil and/or water) from the treatment site. Such samples are contacted with a sulfur-based bulk reductant (e.g., dithionite) of varying reducing agent concentrations on a bench-scale in order to determine effective concentrations of the reducing agent. A concentration of reducing agent that is successful in substantially eliminating (e.g., concentration reduction of 95%) the oxidized organic and/or inorganic compounds (e.g., contaminants of concern) may be a useful concentration for widespread application for a treatment site. In certain embodiments, such a concentration (or higher concentrations) of reducing agent may be used to eliminate the contaminants of concern. Samples may also be tested with buffered sulfur-based bulk reductants. In certain embodiments, the method further includes contacting the sulfur-based bulk reductant with the composition in situ, wherein the concentration of reducing agent is effective to remove and/or transform oxidized organic and/or inorganic compounds. Because the methods of the present disclosure are based upon free-radical chemistry, it is useful to apply at least a stoichiometric amount of reducing agent on the treatment site, relative to the amount of contamination in the treatment site.

According to the present disclosure, the sulfur-based bulk reductant may include a solid which may be contacted with a contaminated composition (e.g., soil and/or water). For example, the sulfur-based bulk reductant may be a solid (e.g., a dry solid) which may be contacted with a contaminated composition (e.g., soil and/or water). Such a sulfur-based bulk reductant solid may be mixed with contaminated compositions (e.g., soil). In some embodiments, contacting further includes adding additional water to the sulfur-based bulk reductant solid either prior to or after mixing the sulfur-based bulk reductant with the contaminated composition. The sulfur-based bulk reductant solid may be formed into any useful shape (pellets, tablets, or the like) and any useful size for a particular application.

In one or more embodiments, a sulfur-based bulk reductant solid may also incorporate a controlled-release agent that permits a controlled release of the reducing agent in water. As used herein, "controlled release" means release of one or more reducing agents and optionally one or more buffers, wherein the rate of release of such components is effective to treat a composition that includes contaminants (e.g., oxidized compounds). For example, a sulfur-based bulk reductant with a controlled-release agent may be capable of releasing a reducing agent and buffer in a manner effective to treat a contaminated composition over a period of time. Such controlled release may be accomplished through the use of controlled-release agents such as controlled-release microstructures described in, for example, U.S. Pat. No. 6,280,759 (Price et al.). Controlled-release agents as used in detergent, pharmaceutical, and pesticide applications, such as, for example, water soluble films available from Monosol (Merrillville, Ind.), CWS Packaging (Norwich, N.Y.), and Aicello North America (North Vancouver, BC, Canada) may be used. Sulfur-based bulk reductants of the present disclosure may be bulk reductants that are, for example, encapsulated in controlled-release tablets or coated with a controlled-decay polymer. In certain embodiments, a sulfur-based bulk reductant solid may preferably contain components that already exist in the composition (e.g., marine environment) to be treated, such as alginates (e.g., sodium alginate), silicas, clay nanocomposites, etc.

In one or more embodiments, a sulfur-based bulk reductant solid may be placed in a fluid (e.g., water) near an unexploded ordnance (UXO), such as an underwater unexploded ordnance (UWUXO), allowing controlled release of the reducing agent and contact of the reducing agent with oxidized organic and/or inorganic compounds from the UXO (or UWUXO) in surrounding fluid (e.g., water) and/or sediment. In one or more embodiments, a sulfur-based bulk reductant may include a thickening agent such as an alginate, such that the sulfur-based bulk reductant can be applied to, for example, a UWUXO, in the form of a paste, thereby allowing controlled-release of the bulk reductant. Alternatively, a sulfur-based bulk reductant may include silica gel and may, for example, be placed on a UWUXO, allowing controlled-release of the bulk reductant. Contact with the sulfur-based bulk reductant may be enhanced by, for example, using an abrasive water jet to cut open the UWUXO. In certain embodiments, the surrounding fluid may be salt water, such as sea water, brine, or brackish water, or may alternatively be fresh water. Underwater disposal technologies have included demolition technologies, such as high order blow-in-place (BIP), low order BIP, and consolidate and blow; abrasive water jet cutting; and entombment.

In one or more embodiments, a sulfur-based bulk reductant for use in remediation of a contaminated composition (e.g., soil and/or water) may include sodium dithionite and a controlled-release agent. In certain embodiments, such a sulfur-based bulk reductant may further include a buffer, which may include potassium (e.g., a potassium-based buffer). For example, a potassium-based buffer may include potassium carbonate and potassium bicarbonate. A sulfur-based bulk reductant may further include water and have a buffer in concentrations of 0.4 molar potassium carbonate and 0.04 molar potassium bicarbonate. In one or more embodiments, such a sulfur-based bulk reductant including sodium dithionite, a controlled-release agent, and optionally a buffer, can be a solid.

Compositions contaminated with one or more oxidized organic and/or inorganic compounds can arise from a wide variety of sources. For example, methods of the present disclosure may be used to treat silty clay soil containing TNT, RDX, and/or picric acid; demilitarization and/or militarization wastewater containing picric acid, TATNB, TNT, RDX, and/or DNTs; an aqueous solution of picric acid. Training and testing ranges for military equipment and munitions testing may contain, for example, contaminated soil and/or water. In such areas, the highest concentrations of oxidized organic and/or inorganic compounds may be near the surface or in shallow depths (e.g., within 1, 5, 10, or 20 centimeters from the surface). In some areas, contamination may be present further below the surface of the soil. In some cases, the energetic or explosive material may be seen on the soil surface in, for example, a powder form. Such sites are called "hot spots" and may be effectively remediated with methods in the present disclosure. Remediation of soil and water may allow for effective range sustainment and management.

Use of sulfur-based bulk reductants as described herein may have advantages over use of alkali/lime for hydrolytic remediation. In one or more embodiments, a sulfur-based bulk reductant may be effective at lower pH values (pH greater than 8 for sulfur-based bulk reductants vs. pH greater than 10 for hydrolytic alkali/lime remediation) and may require less reducing agent to achieve complete degradation than may be required for hydrolytic alkali/lime remediation. Remediation using sulfur-based bulk reductants of the present disclosure may have a faster rate of reaction than hydrolytic remediation using alkali/lime. Remediation using sulfur-based bulk reductants of the present disclosure can be effective for reducing many metals and remediation of other oxidized organic compounds, whereas hydrolytic remediation using alkali/lime can be effective for a limited number of metals and is not effective for treatment of some oxidized organic contaminants (e.g., chlorinated solvents). Finally, vegetation may be reestablished in areas treated with sulfur-based bulk reductants of the present disclosure, whereas reestablishing vegetation can be more difficult in areas treated using alkali/lime for hydrolytic remediation. In one or more embodiments, the sulfur-based bulk reductant may be less effective in the presence of oxygen than alkali/lime hydrolysis.

As used herein, "contacting" means bringing into direct contact a sulfur-based bulk reductant and a composition that includes one or more contaminants (e.g., oxidized organic and/or inorganic compounds), such that the sulfur-based bulk reductant may participate in a chemical reaction with the one or more contaminants (e.g., oxidized organic and/or inorganic compounds). Such contacting may result in a chemical reaction that chemically reduces one or more oxidized organic and/or inorganic compounds. Such contacting may cause, for example, cleavage of an aromatic oxidized organic compound and/or mineralization of one or more oxidized organic and/or inorganic compounds. Contacting may be accomplished in a wide variety of methods that are known or may be developed in the future. For example, a sulfur-based bulk reductant may be applied to a contaminated composition by spraying on or mixing with the contaminated composition. Such mixing with a contaminated composition (e.g., soil) may be accomplished by a technique similar to application of fertilizer in a farm field. In one or more embodiments of the present disclosure, contacting may preferably include mixing the contaminated composition with the sulfur-based bulk reductant, which may result in increased degradation or transformation of contaminants as described herein.

When the oxidized organic and/or inorganic compounds are predominantly near the surface of a contaminated composition (e.g., soil), applying a sulfur-based bulk reductant in a liquid form on the surface and allowing the sulfur-based bulk reductant to seep (infiltrate, leach or absorb) into the composition may provide for rapid remediation. Alternatively, when the oxidized organic and/or inorganic compounds are predominantly near the surface of a contaminated composition (e.g., soil), applying a sulfur-based bulk reductant in a solid form on the surface (or mixing therein), adding additional waster, and allowing the sulfur-based bulk reductant to seep (infiltrate, leach or absorb) into the composition may also provide for rapid remediation. Alternatively, when the contaminants (e.g., oxidized compounds) are below the surface of the contaminated composition, the sulfur-based bulk reductant may be in liquid form and may be injected into the subsurface or groundwater. For example, in situ chemical degradation of oxidized organic and/or inorganic compounds (i.e., explosive compounds) in groundwater may occur as a result of injecting a sulfur-based bulk reductant therein. Injection or application of the sulfur-based bulk reductant may be relatively inexpensive compared to methods that involve excavation. For treating compositions with contamination at deeper depths under the surface of the composition (e.g., soil), large-diameter augers (LDAs) may be employed to mix the composition with a sulfur-based bulk reductant. Large-diameter augers may allow mixing and injection of a sulfur-based bulk reductant at depths of for example, 0 meters to 30 meters below the ground surface (e.g. depths below ground surface of 0 meters to 8 meters, 0 meters to 15 meters, 0 meters to 23 meters, 8 meters to 30 meters, 15 meters to 30 meters, or 23 meters to 30 meters). Large-diameter augers may also allow mixing and injection of a sulfur-based bulk reductant at depths of more than 30 meters below the ground surface. Use of a large-diameter auger may also allow for multiple treatments in one pass and may allow for capture and removal of off-gases. Soil mixing services using large diameter augers may be available from FEC Corporation (Orlando, Fla.). In one or more embodiments, a sulfur-based bulk reductant may be used to treat groundwater using injection wells. "Direct-push" technology (i.e., technology in which tools or sensors are pushed into the soil surface without the use of drilling) may be used in soil testing and/or to apply a liquid bulk reductant (e.g., to treat contaminated groundwater). For example, injection, using direct-push technology, of a bulk reductant (e.g., sulfur-based bulk reductant) may allow injection of up to 50 gallons per minute and may require no new installation of wells. Injection systems utilizing direct-push technology may be available from Geoprobe Systems (Salina, Kans.) and direct-push technology services may be available from Badger Injection Solutions, LLC (Apopka, Fla.).

The methods of the present disclosure may also be used to treat wastewater streams including oxidized organic and/or inorganic compounds. Sources of such wastewater streams may be, for example, munitions manufacturing plants and facilities that process or dismantle military equipment. For example, casings of munitions that are dismantled or decommissioned may contain residual amounts of energetic compounds or explosives. Such casings may be treated by contacting the casings with a sulfur-based bulk reductant to reduce or remove any oxidized organic and/or inorganic compounds therefrom. Such treatment of a casing may be performed prior to the recycling of the casing.

In one or more embodiments, the contacting of a sulfur-based bulk reductant and a contaminated composition to be treated may occur in situ or ex situ. For example, when a composition to be treated includes soil, the contacting may occur wherever the composition to be treated is located (i.e., in situ). Such contacting in situ may be accomplished at the treatment site, for example, by applying (e.g., spraying) the sulfur-based bulk reductant to the contaminated composition (e.g., soil) and allowing the composition to receive (i.e., absorb) the sulfur-based bulk reductant. Ex situ contacting may be accomplished by extracting a composition sample (e.g., soil sample) from a treatment site and applying the sulfur-based bulk reductant to the composition sample in another location. Such ex situ treatment may be performed on a small (e.g., bench) scale or on a larger scale by mixing the soil to be treated with the sulfur-based bulk reductant (and optionally additional water). A wide variety of methods of mixing the soil to be treated with the sulfur-based bulk reductant can be used, including use of large diameter augers or sowing the sulfur-based bulk reductant into the soil with methods similar to application of farm fertilizer.

Methods of the present disclosure may be performed without utilizing other remediation methods. However, methods of the present disclosure may be combined with other remediation methods, such as bioremediation, incineration, and creating passive reactive zones, each of which are described below.

Some remediation methods utilize biological material and biological processes to remediate a treatment site for the removal of oxidized compounds. Such methods include composting, wherein biological material and water are added to a treatment site. In such biological processes, microbial action in compost can be relatively slow, as compared to some chemical treatment processes. Further, it has been a challenge for bioremediation processes to chemically reduce particular oxidized organic compounds, such as dinitrotoluenes (DNTs). Also, when the oxidized organic compounds are in very high concentrations in a composition (e.g., soil), an explosion risk exists in bioremediation processes. In contrast to bioremediation processes, in one or more embodiments of the present disclosure, the method of treating a contaminated composition may be abiotic. In such an abiotic method, the contaminated composition is treated chemically with a bulk reductant. Because the methods of the present disclosure utilize free radicals, such chemical treatment may allow faster remediation than biological processes (i.e., bioremediation). In one or more embodiments of the present disclosure, chemical treatment may be several orders of magnitude faster than biological processes.

Remediation processes include incineration, but incineration of large amounts of soil is labor intensive and equipment intensive, involving soil excavation. Also, incineration is not generally performed in situ.

Another remediation process utilizes elemental iron to facilitate in situ reductive degradation of oxidized compounds. However, such a process involves use of large quantities of elemental iron for some applications.

Further, bulk reductants (e.g., sulfur-based bulk reductants) have been utilized to engineer "passive reactive zones" of reduced iron species in clay minerals, as described in U.S. Pat. No. 5,783,088 (Amonette et al.). A "passive reactive zone" is a spatially-fixed zone containing Fe(III) in layered aluminosilicate located in an aquifer, wherein the Fe(III) has been reduced to Fe(II) by using, for example, a dithionite solution. Then, as contaminated media (i.e., groundwater) flow through the passive reactive zone, oxidized contaminants are chemically reduced in the passive reactive zone. Such passive reactive zones are not necessary in the methods of the present disclosure.

In one or more embodiments, contacting a sulfur-based bulk reductant with a composition that includes contaminants (e.g., oxidized organic and/or inorganic compounds) may be performed more than once. In other words, the sulfur-based bulk reductant may be applied to a particular treatment site in one or more doses in order to effectively remediate the composition (e.g., soil and/or water). In such embodiments, the second or subsequent applications of sulfur-based bulk reductant need not be of the same concentration or be buffered to the same pH as the first or previous applications. For example, the second or subsequent application may contain a lower concentration of sulfur-based bulk reductant than the first or previous applications.

Another aspect of the present disclosure relates to a sulfur-based bulk reductant for use in remediation of contaminated soil and/or water. In one or more embodiments, the sulfur-based bulk reductant includes an aqueous solution having a concentration of at least 10 mM of dithionite and buffered to a pH of at least 7. In some embodiments, the concentration of dithionite may be at least 30 mM, at least 50 mM, at least 100 mM, at least 200 mM, at least 300 mM, or greater than 300 mM. In such a sulfur-based bulk reductant, the aqueous solution of dithionite may be buffered to a pH greater than 7, such as at least 8, at least 9, at least 10, at least 11, or greater than 11.

In one or more embodiments, a method of the present disclosure may be used to treat a composition that includes soil and/or water and one or more chlorinated organic compounds. Such a method may be a remediation method for removing contaminants (e.g., chlorinated organic compounds) from and/or transforming contaminants in soil and/or water. The method includes contacting a sulfur-based bulk reductant, as described herein, with the composition. Such contacting may cause reductive dechlorination of one or more chlorinated organic compounds. In certain embodiments, one or more chlorinated organic compounds may include aliphatic and/or aromatic groups. In one or more embodiments, one or more chlorinated organic compounds include, but are not limited to, PCBs (polychlorinated biphenyls), DDT (dichloro-diphenyl-trichloroethane), and other pesticides.

In one or more embodiments, a method may be used to treat a composition that includes soil and/or water and one or more chemical warfare agents. Such a method may be a remediation method for removing contaminants (e.g., chemical warfare agents) from and/or transforming contaminants in soil and/or water. The method includes contacting a sulfur-based bulk reductant, as described herein, with the composition having the one or more chemical warfare agents. Such contacting may cause reductive dechlorination of one or more chemical warfare agents.

In one or more embodiments of the present disclosure, a contaminated composition (e.g., soil and/or water) may include one or more chemical warfare agents. Chemical warfare agents include a wide variety of compounds which may be, for example, nerve agents, blister/vesicant agents, and/or pulmonary agents. In the present disclosure, chemical warfare agents include, but are not limited to, mustard (NATO military designation, HD), sarin (NATO military designation, GB), VX, soman (NATO military designation, GD), Lewisite (NATO military designation, L), Adamsite (NATO military designation, DM), chloropicrin (NATO military designation, PS), chloroacetophenone, and o-chlorobenzalmalonitrile. Reductive dechlorination of chemical warfare agents may result in the formation of one or more degradates. Degradates of mustard include, for example, thiodiglycol, 1,4-oxathiane, 1,4-dithiane, benzothiazole, and dimethyldisulfide. Degradates of sarin include, for example, isopropylmethylphosphonic acid (IMPA) and methylphosphonic acid (MPA). Degradates of VX include, for example, ethylmethylphosphonic acid (EMPA), methylphosphonic acid (MPA), and EA 2192 (S-(2-diisopropylaminoethyl)methylphosphonothioic acid). Degradates of soman include, for example, pinocolylmethylphosphonic acid and methylphosphonic acid (MPA). Degradates of Lewisite include, for example, chlorovinylarsine oxide, chlorovinylarsonic acid, and chlorovinylarsonous acid. Degradates of Adamsite include, for example, 10, 10' oxybis(5,10-dihydrophenarsine). Degradates of chloroacetophenone include, for example, acetophenone. Degradates of o-chlorobenzalmalononitrile include, for example, malononitrile.

The following examples are offered to further illustrate various specific embodiments and techniques of the present invention. It should be understood, however, that many variations and modifications understood by those of ordinary skill in the art may be made while remaining within the scope of the present invention. Therefore, the scope of the invention is not intended to be limited by the following examples.

EXAMPLES

Soil Preparation: The soils used in Examples 1-3 were explosives-contaminated soils collected from a former ammunition plant, Longhorn Army Ammunition Plant. The composition to be treated at this site was clay loam soil having a particle size distribution as follows: sand 29.55%, silt 33.76%, clay 36.68%. The mineralogy of the clay portion was mixed layer illite-smectite and kaolinite. The highest TNT concentration measured in this site was 348 mg/kg (milligram per kilogram). The average TNT concentration in the soil prior to treatment was 243 mg/kg (milligram per kilogram).

The aged, contaminated soil was brought back to the laboratory and air-dried, ground, homogenized, and stored in an environmental room in the dark until used in the individual experiments. As used herein, a contaminated soil is aged when the contaminant has equilibrated with the soil for a considerable period of time (e.g., years), which may have resulted in transformation of some of the contaminant. For example, some of the TNT compounds may have transformed into ADNT compounds while aging.

Sulfur-Based Bulk Reductant Preparation: Aqueous solutions (250, 125, 32.5, 31.25, and 10 mM (millimolar)) of dithionite were prepared using deionized, deoxygenated water and were used within 15 minutes to minimize the amount of dithionite degradation in the presence of molecular oxygen ($O_2$).

Example 1

Batch Transformation

Experiments were conducted to study the effects of concentration of a sulfur-based bulk reductant (dithionite) on the degradation of the targeted explosive compounds. To determine a useful concentration of dithionite for complete degradation of TNT and DNTs in soil, batch experiments were conducted on contaminated soils from field sites using 250, 125, 32.5, 31.25, and 10 mM (millimolar) aqueous solutions of dithionite.

Two grams (2 g) of contaminated soil was placed into pre-weighed 60 mL (milliliter) vials deoxygenated with argon for two minutes. To each two grams of contaminated soil was added 50 mL (milliliter) of dithionite solution and the vial was sealed with a screw cap fitted with a rubber septum. The batch samples were equilibrated for one hour, at which point they were extracted for analysis by gas chromatography.

Four batch samples consisting of 2 grams contaminated soil and 50 mL (milliliters) deoxygenated, deionized water were prepared as controls and handled in parallel with these experiments.

Figure 2:
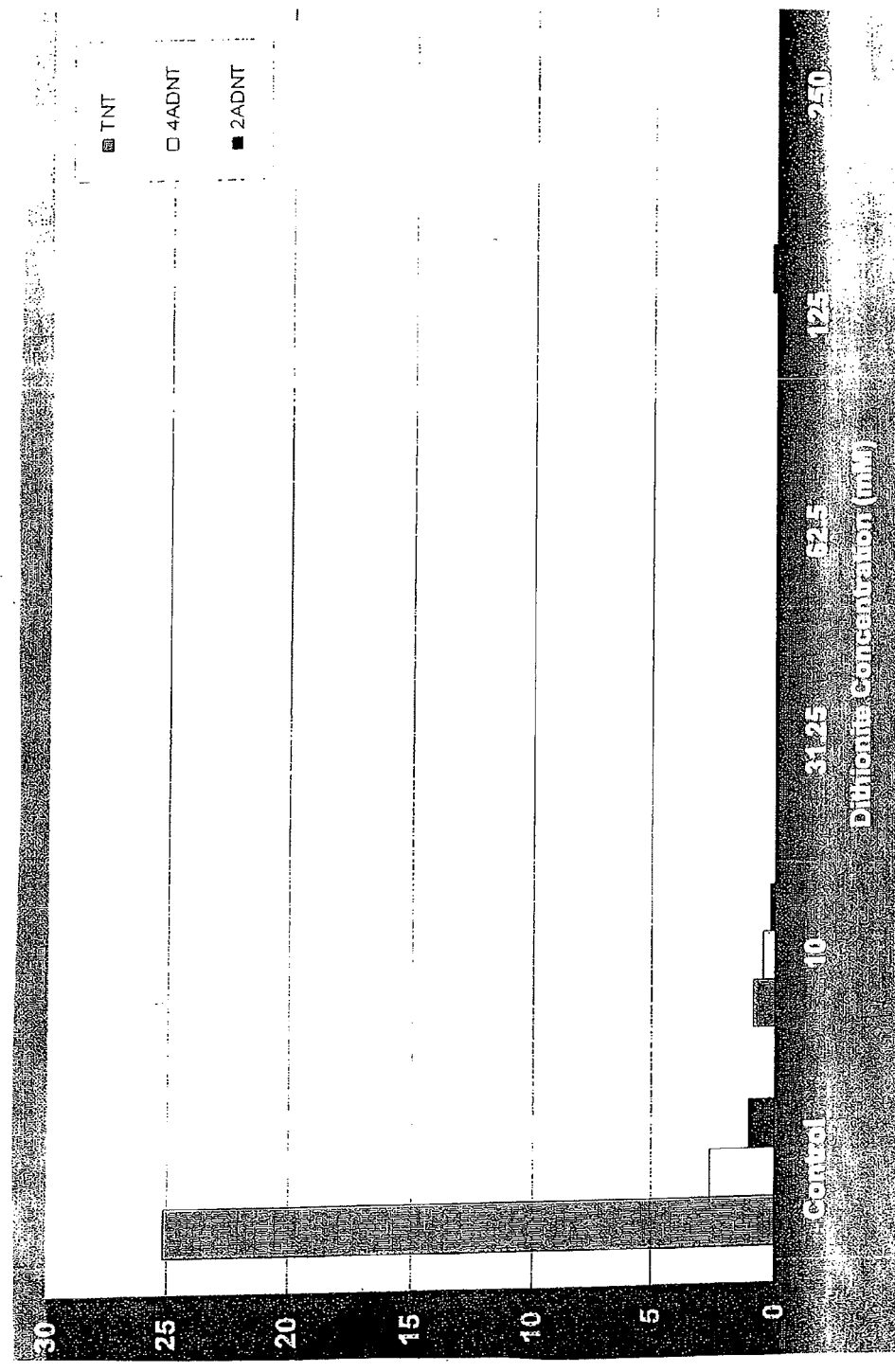
FIG. 2 shows concentrations of 2,4,6-trinitrotoluene (TNT), 4-amino-2,6-dinitrotoluene (4-ADNT), and 2-amino-4,6-dinitrotoluene (2-ADNT) in an aqueous solution decanted from dithionite-treated soil for various concentrations of dithionite in a sulfur-based bulk reductant, as described in Example 1.

FIGS. 1 and 2 show the concentrations of TNT, 4-ADNT, and 2-ADNT in each of the treated soil and aqueous samples after a one-hour reaction time. Dithionite concentrations of 62.5 mM (millimolar) or greater were found to be effective for the rapid transformation of TNT and DNTs in soil at both acidic and basic pH conditions (buffered and unbuffered). The preferred concentration of sulfur-based bulk reductant (e.g., dithionite) is expected to change with the level of explosives contamination in the soil.

Referring to FIG. 1, for unbuffered batch soil samples (at pH 6) treated for one hour with dithionite, it was observed that the 10 mM (millimolar) dithionite solution removed 75% of the initial explosive compounds present in the soil (less than 30 mg/kg TNT remaining after treatment), as compared to a control sample (more than 100 mg/kg TNT remaining after treatment). With increasing concentration of dithionite, increasing amounts of TNT, 4-ADNT, and 2-ADNT were degraded.

Referring to FIG. 2, at 10 mM (millimolar) dithionite, some TNT and ADNT isomers were present in the aqueous phase. In comparison, treatment with 31.25 mM (millimolar) dithionite produced no detectable TNT/ADNT in the aqueous phase due to degradation of the parent compounds and the intermediate products.

Example 2

Effect of Buffering and Batch Kinetics

Batch experiments were set up in a similar manner as the concentration variable experiments in EXAMPLE 1. Two concentrations of dithionite solutions (10 mM (millimolar) and 31.25 mM (millimolar)) prepared with deoxygenated, deionized water were used to treat ten grams (10 g) of explosives-contaminated soil in 60 mL (milliliters) nominal volume glass vials. The dithionite solutions were prepared and used immediately (within 15 minutes of preparation). For each concentration of dithionite, buffered and unbuffered samples were prepared.

Fifty milliliters (50 mL) of dithionite solution was added to the vial and placed on a rotary shaker during the reaction phase. For the buffered treatments, 0.4 M/0.04 M (molar) potassium carbonate/potassium bicarbonate buffer solution was added to the contaminated soil before treatment with dithionite solution. The potassium-based buffers were chosen over sodium-based buffers to prevent swelling of the clays, which would alter the hydraulic conductivity of the soil. Suitable buffers should be chosen, such that unnecessary swelling of the contaminated composition (e.g., soil) and the altering of the hydraulic conductivity of the contaminated composition are prevented.

At predetermined time intervals (2, 3, 4, 6, 8, 24, and 48 hours), the vials were removed from the mixer and centrifuged at 1000 rpm (revolutions per minute) for 45 minutes on a model UV International Centrifuge. The supernatant phase in each vial was decanted and analyzed for the parent compounds (e.g., TNT) and potential metabolites (e.g., ADNTs). The pH of the aqueous phase was determined by a VWR Model 8015 pH/ISE meter, which was calibrated daily prior to use. The solid phase was analyzed for parent compounds and likely metabolites.

Multiple controls were prepared for analysis and comparison with the corresponding treated samples. For the unbuffered experiments, the controls consisted of equivalent mass of contaminated soils and volume of deoxygenated, deionized water as used in the treated samples. For the buffered experiments, controls consisted of buffered deoxygenated, deionized water and ten grams (10 g) of the contaminated soils.

Figure 3:
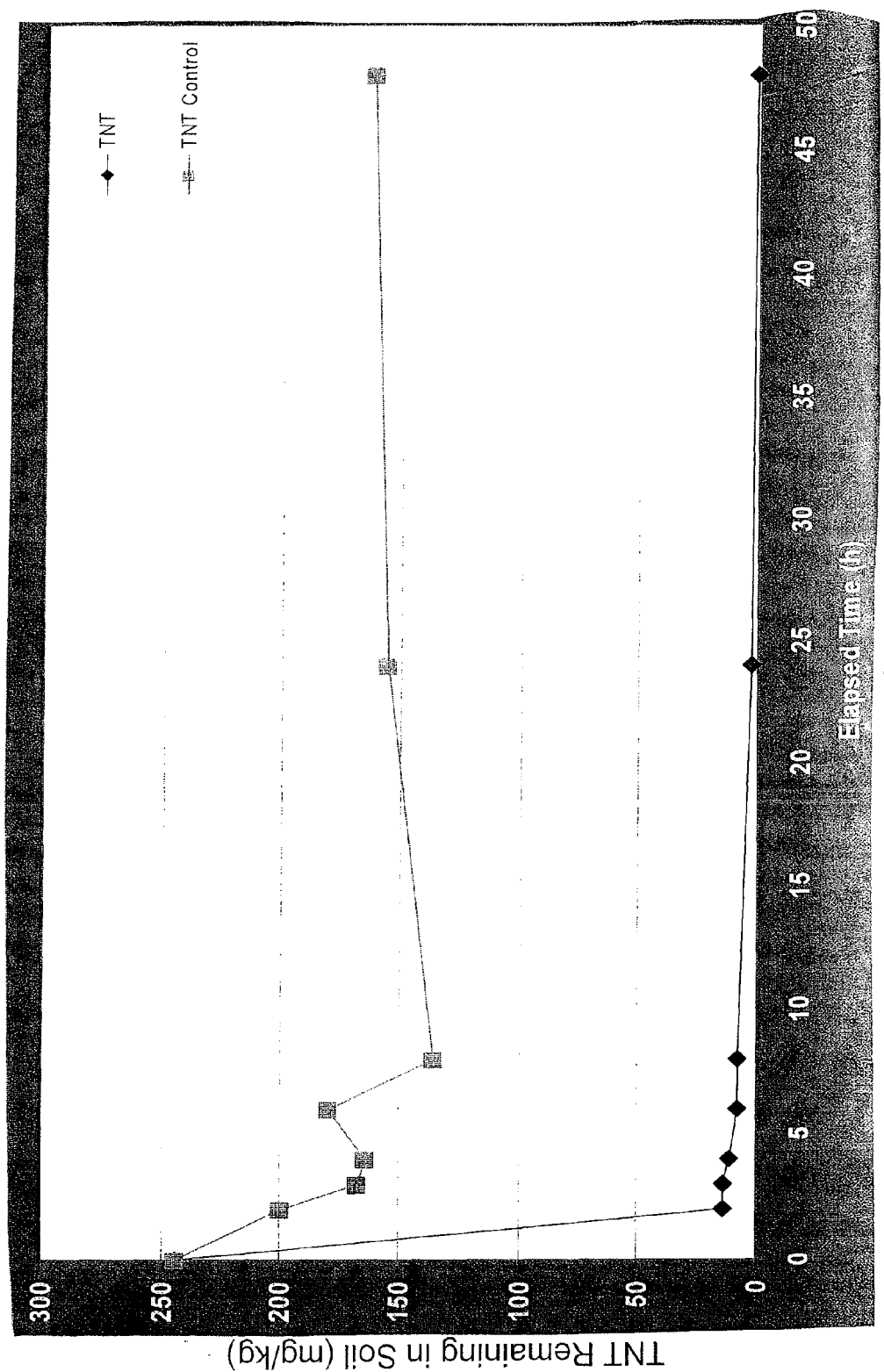
FIG. 3 shows concentrations of TNT in soil treated with 31.25 mM dithionite (labeled "TNT") and 0 mM dithionite (labeled "TNT Control") in an unbuffered sulfur-based bulk reductant for various reaction times, as described in Example 2.
Figure 4:
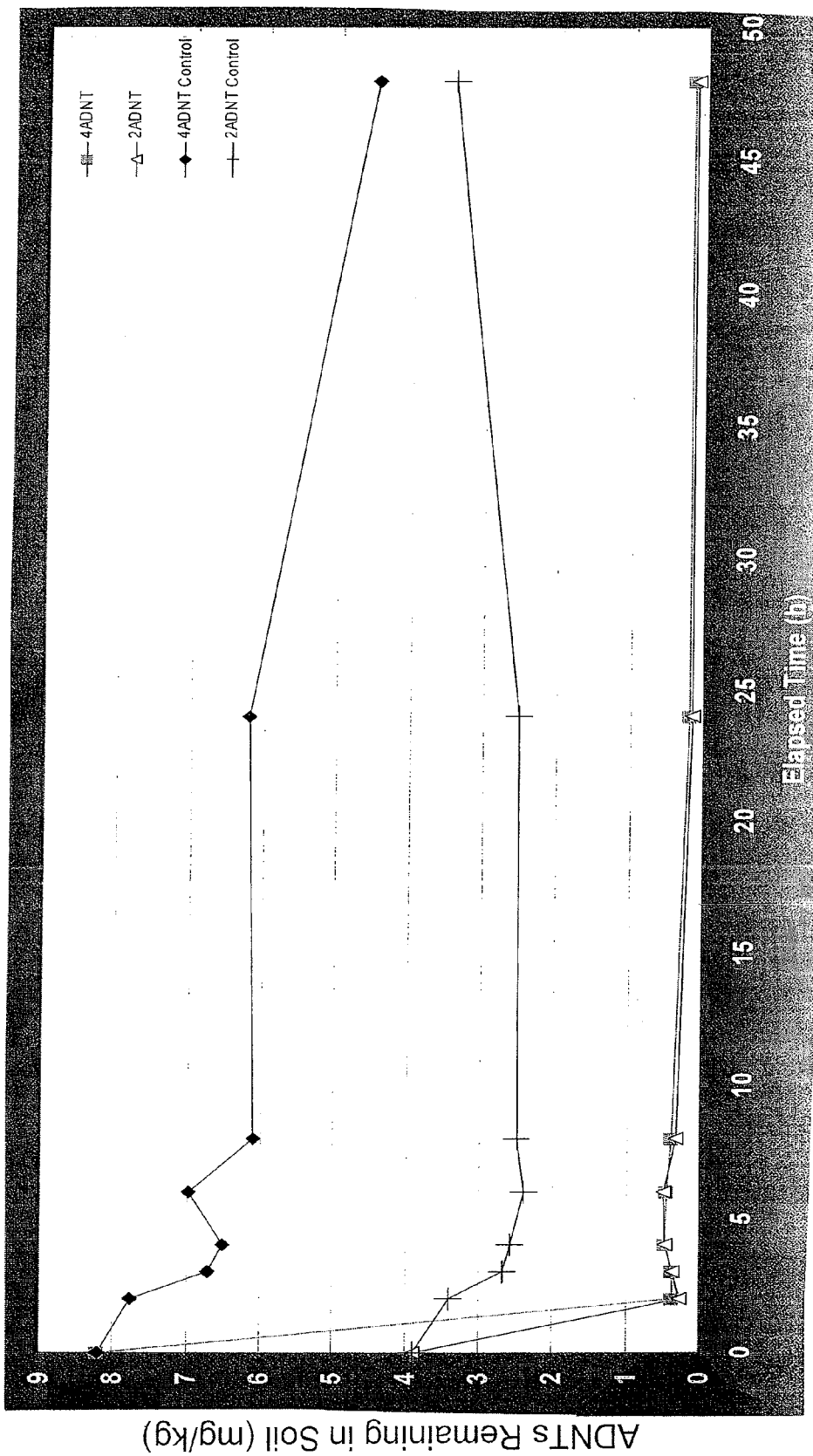
FIG. 4 shows concentrations of ADNTs in soil treated with 31.25 mM dithionite (labeled "4ADNT" and "2ADNT") and 0 mM dithionite (labeled "4ADNT Control" and "2ADNT Control") in an unbuffered sulfur-based bulk reductant for various reaction times, as described in Example 2.
Figure 5:
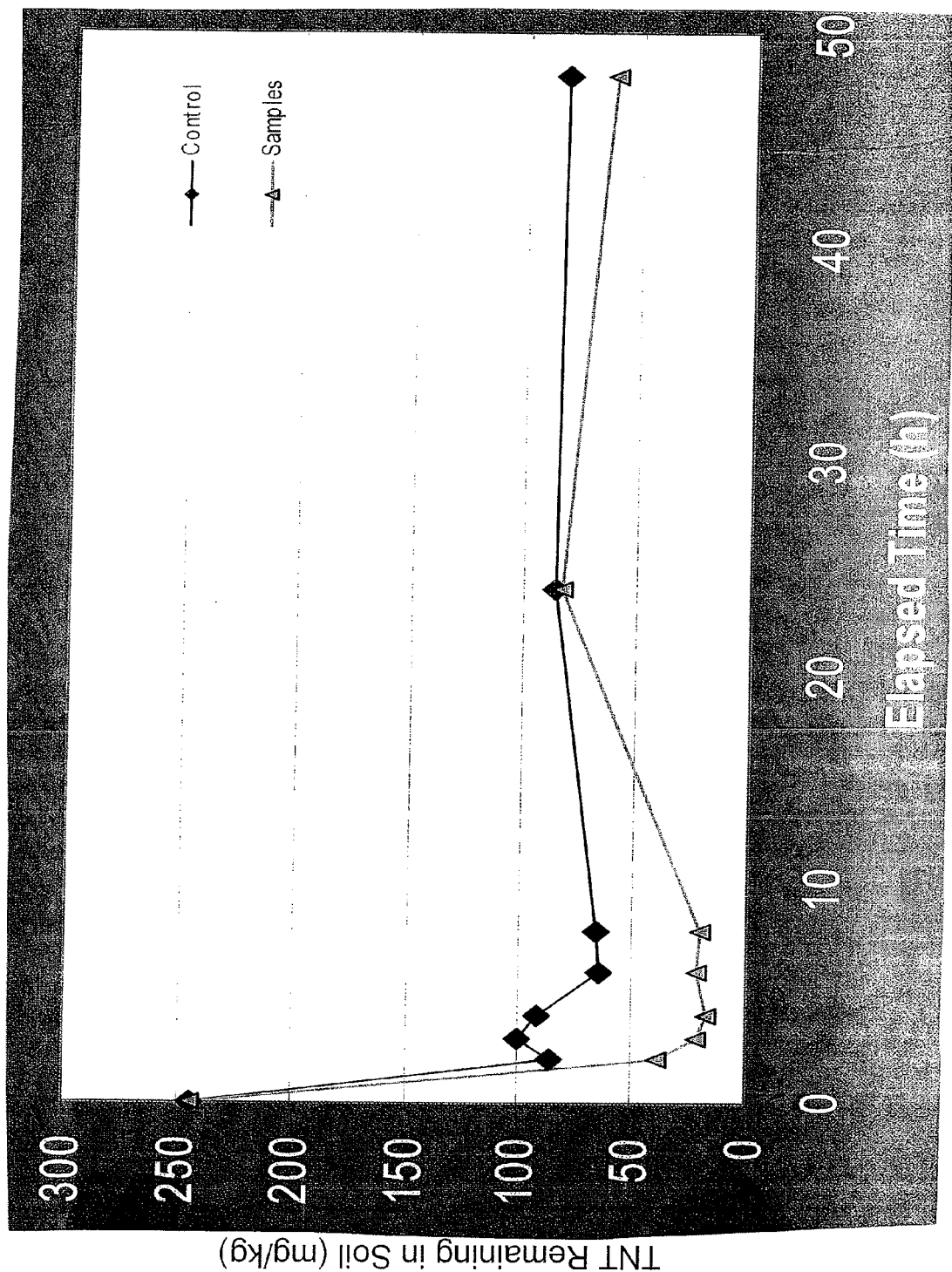
FIG. 5 shows concentrations of TNT in soil treated with 10 mM dithionite (labeled "Samples") and 0 mM dithionite (labeled "Control") in an unbuffered sulfur-based bulk reductant for various reaction times, as described in Example 2.
Figure 6:
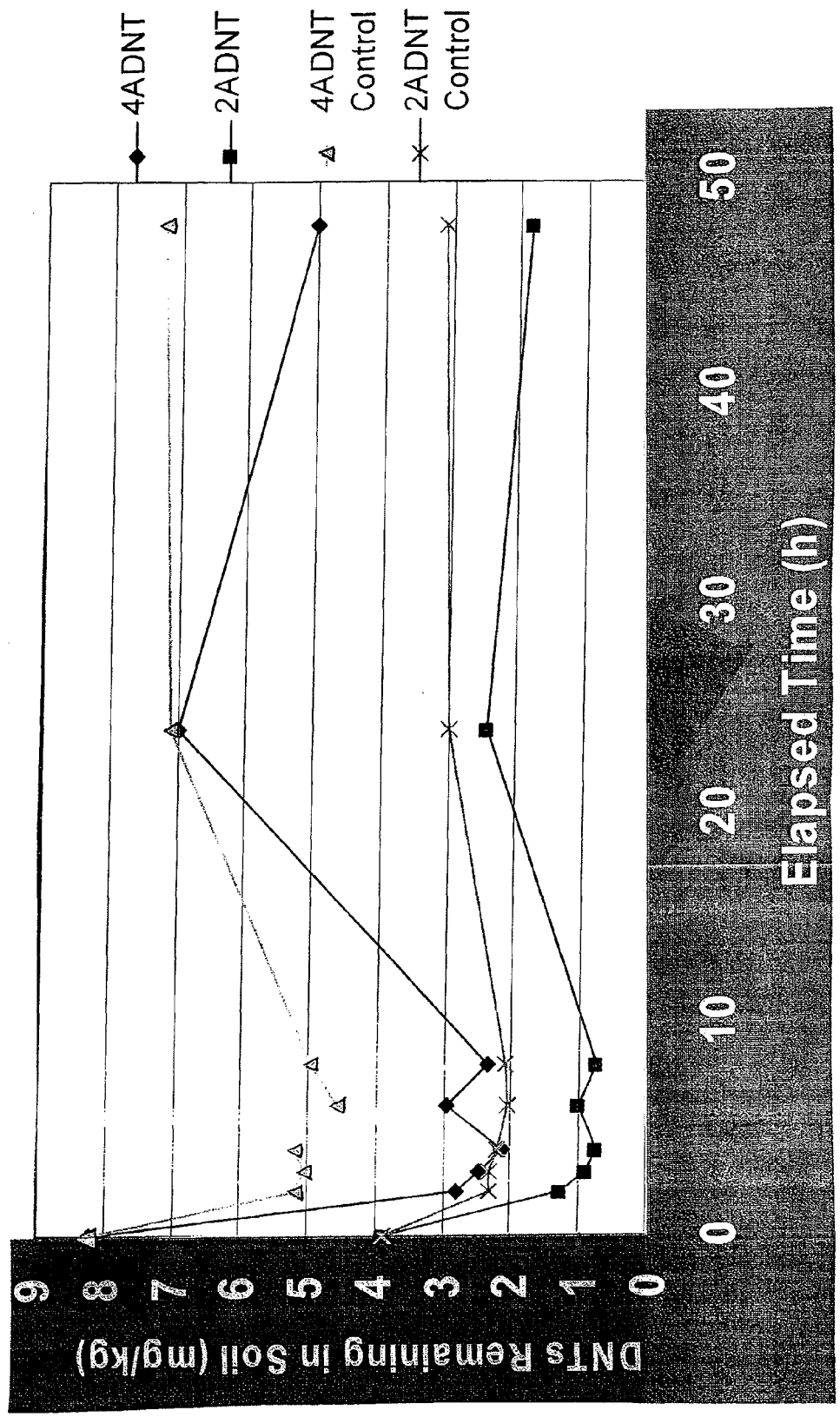
FIG. 6 shows concentrations of ADNTs in soil treated with 10 mM dithionite (labeled "4ADNT" and "2ADNT") and 0 mM dithionite (labeled "4ADNT Control" and "2ADNT Control") in an unbuffered sulfur-based bulk reductant for various reaction times, as described in Example 2.
Figure 7:
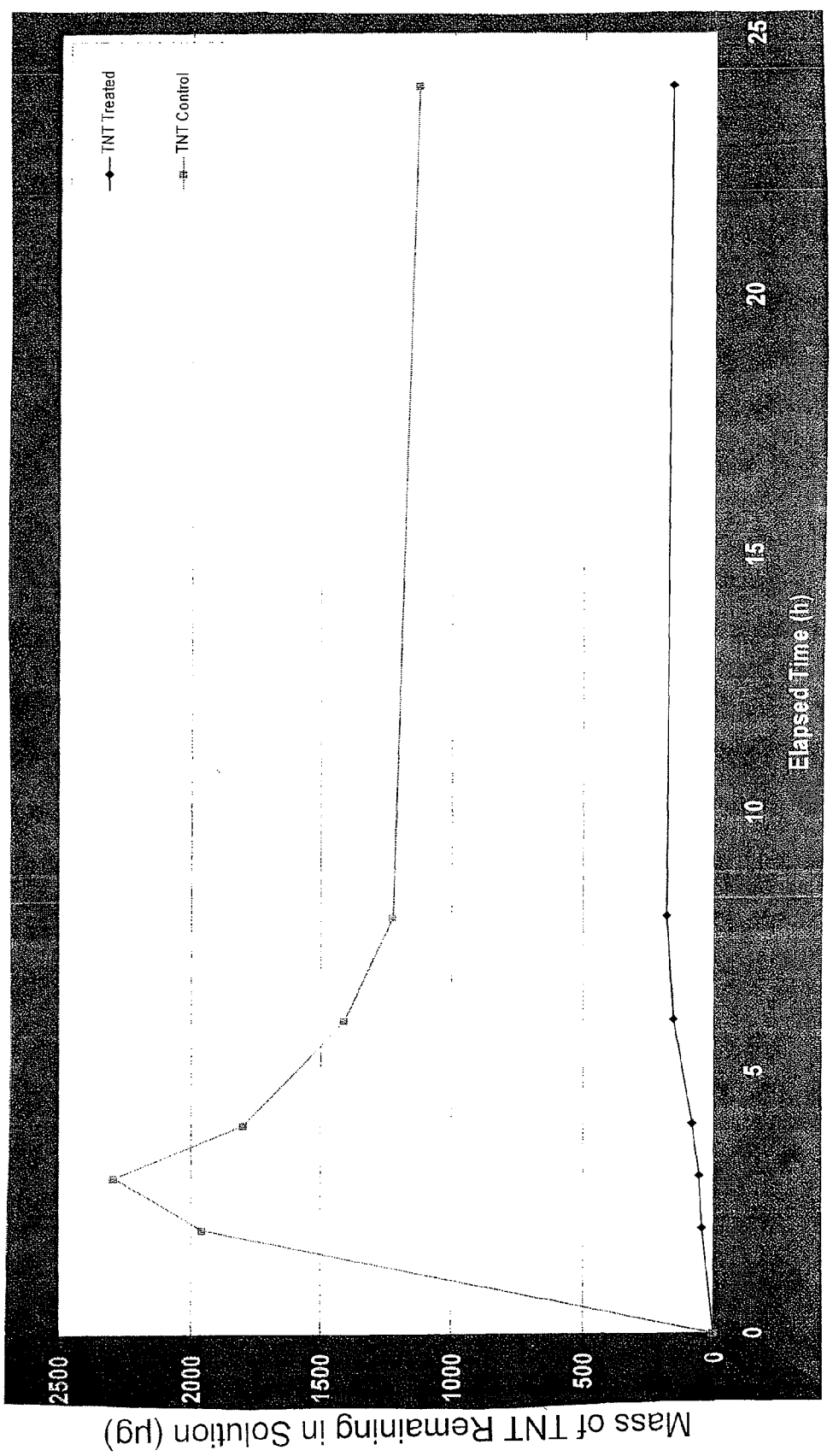
FIG. 7 shows masses of TNT in an aqueous solution decanted from soil treated with 10 mM dithionite (labeled "TNT Treated") and 0 mM dithionite (labeled "TNT Control") in an unbuffered sulfur-based bulk reductant for various reaction times, as described in Example 2.
Figure 8:
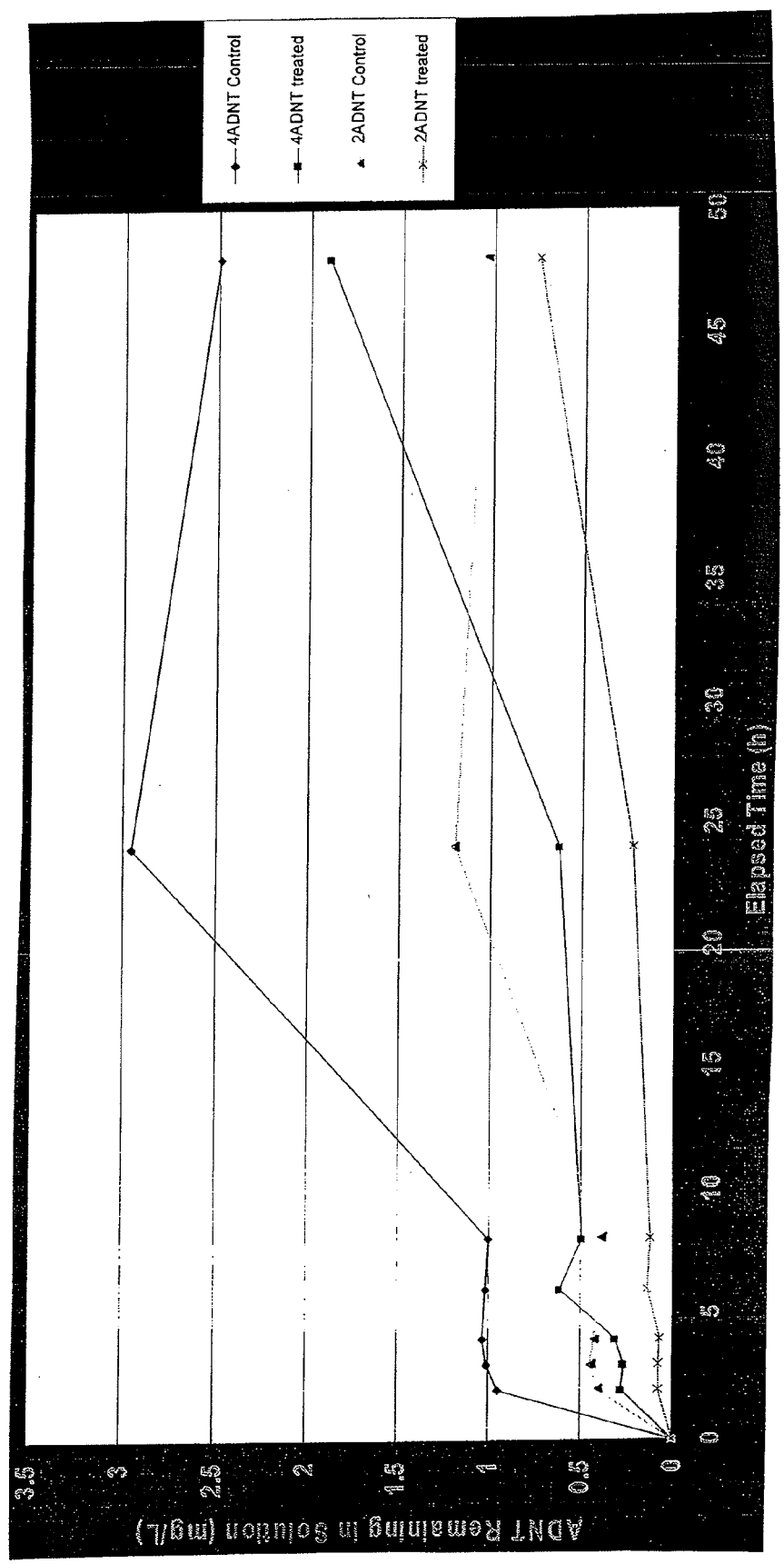
FIG. 8 shows concentrations of ADNTs in an aqueous solution decanted from soil treated with 10 mM dithionite (labeled "4ADNT treated" and "2ADNT treated") and 0 mM dithionite (labeled "4ADNT Control" and "2ADNT Control") in an unbuffered sulfur-based bulk reductant for various reaction times, as described in Example 2.

The concentrations of TNT and ADNT isomers were below the method detection limit in the aqueous phase for each of the 31.25 mM (millimolar) dithionite treatments (buffered and unbuffered). The concentrations of TNT and ADNT isomers in the soil phase for each of the 31.25 mM dithionite treated samples are shown in FIGS. 3 (TNT) and 4 (ADNTs). Dithionite concentrations greater than or equal to 31.25 mM (millimolar) dithionite were useful for the treatment of TNT, including the desorbed fraction in the aqueous phase. In the unbuffered 10 mM (millimolar) dithionite sample, analysis of the solid phase indicated incomplete removal of TNT (FIG. 5) and both 4-ADNT and 2-ADNT (FIG. 6), whereas analysis of the aqueous phase (FIGS. 7 and 8) indicated significant desorption of the TNT from the solid phase to the aqueous phase.

The aqueous and soil phase concentrations of TNT indicated that there was desorption of TNT from soil phase into aqueous phase. However, the desorbed TNT was transformed in the presence of dithionite. After approximately 24 hours, the dithionite was consumed and became limiting. After 24 hours, the TNT concentration in the 10 mM dithionite-treated soils increased progressively in the aqueous phase. It is believed that measuring the concentration of ADNTs versus time can confirm whether the metabolites are accumulating or are being transformed in the presence of dithionite.

Figure 9:
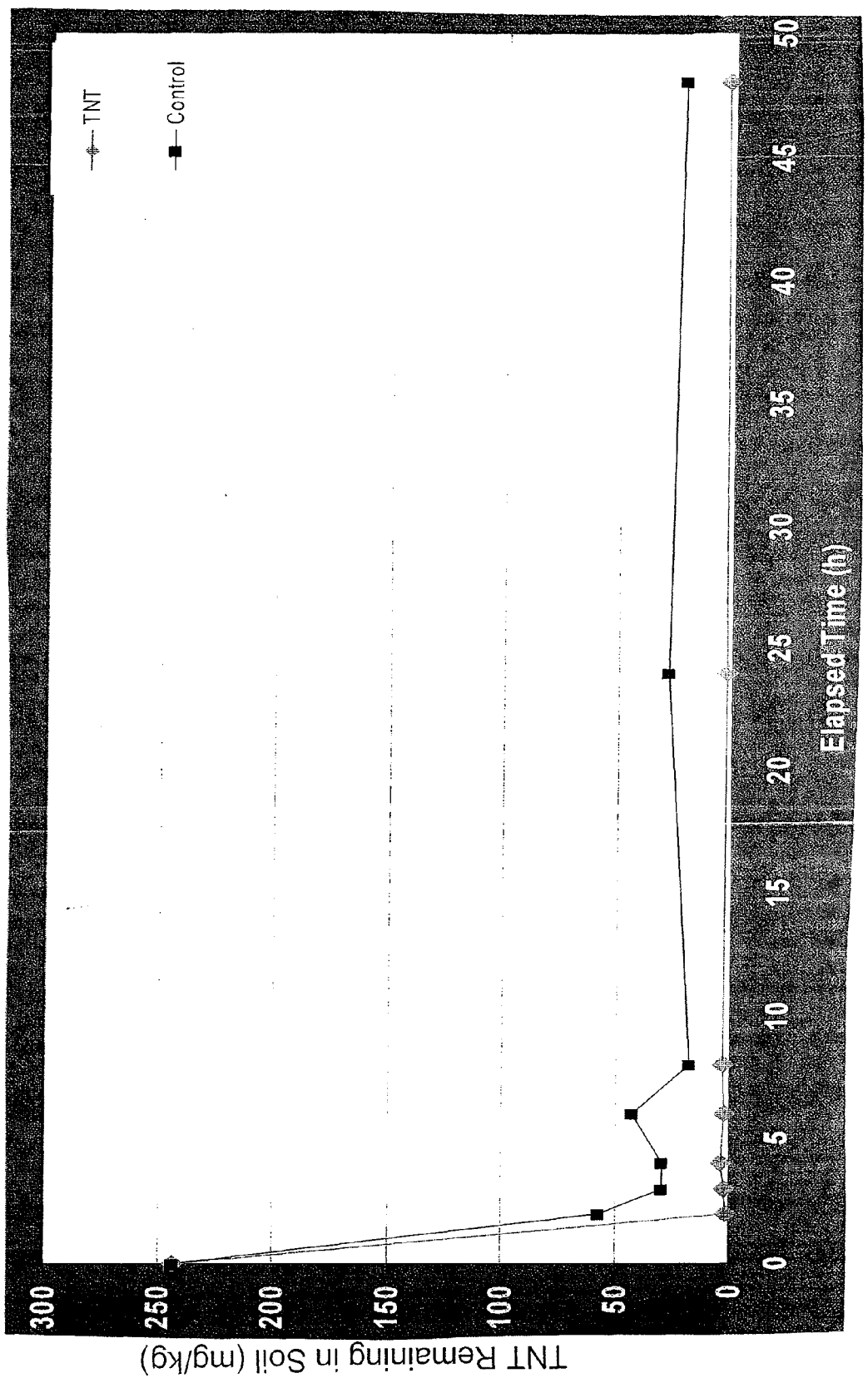
FIG. 9 shows concentrations of TNT in soil treated with 10 mM dithionite (labeled "TNT") and 0 mM dithionite (labeled "Control") in a buffered sulfur-based bulk reductant for various reaction times, as described in Example 2.
Figure 10:
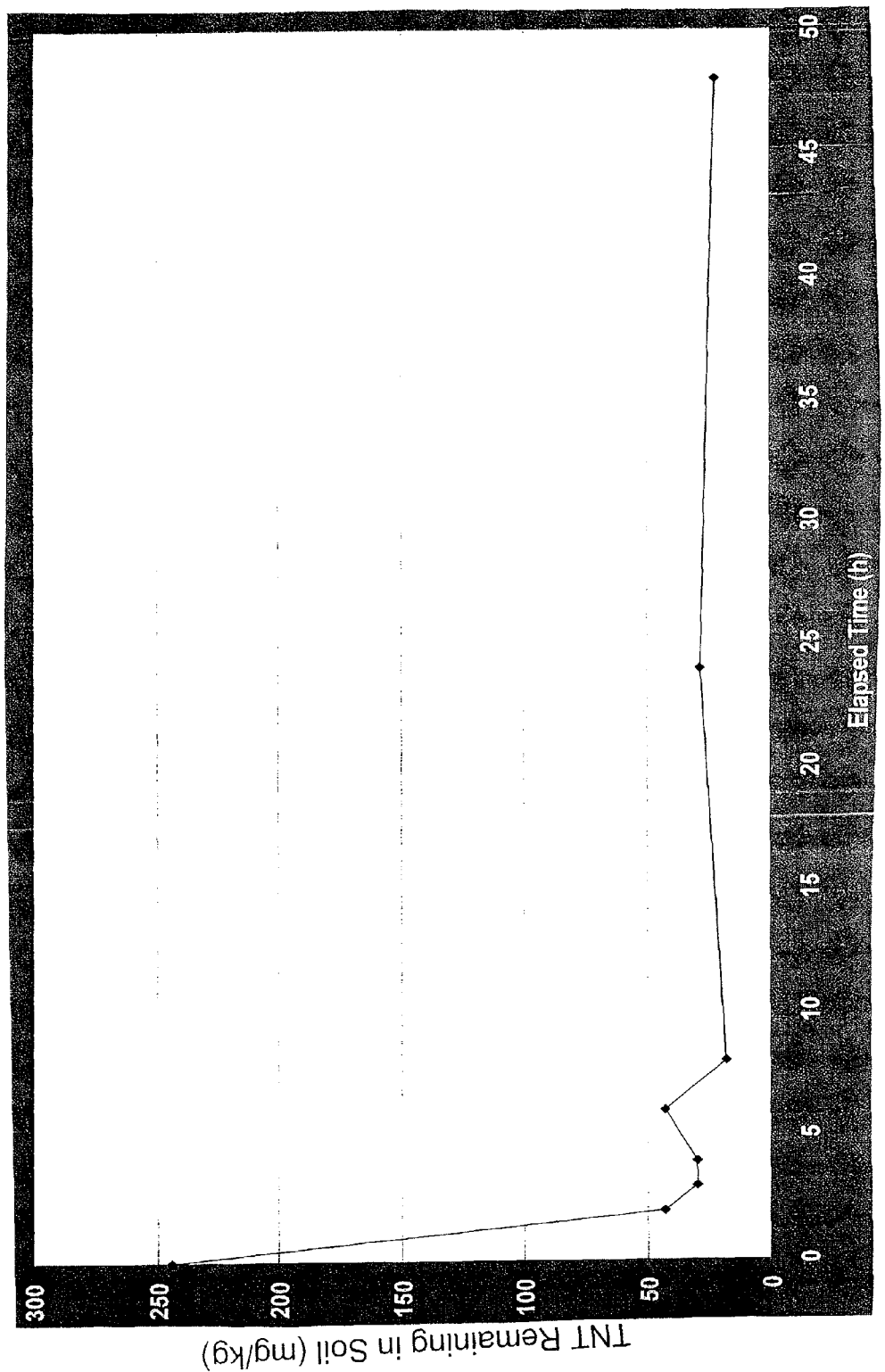
FIG. 10 shows concentrations of TNT in soil treated with 0 mM dithionite in a buffered sulfur-based bulk reductant for various reaction times, as described in Example 2.
Figure 11:
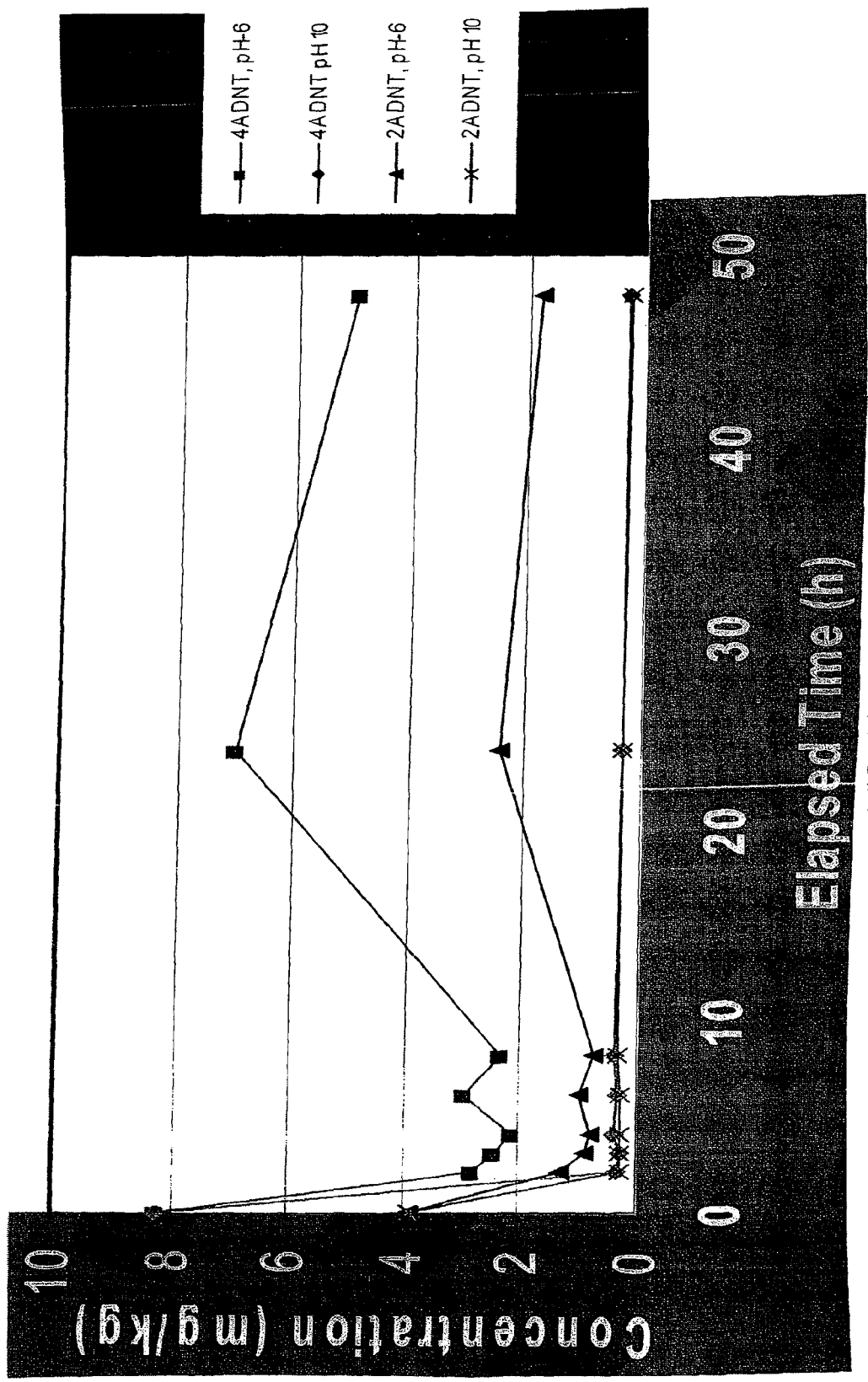
FIG. 11 shows concentrations of ADNTs in soil treated with 10 mM dithionite in a buffered sulfur-based bulk reductant (pH 6) and an unbuffered sulfur-based bulk reductant (pH 10) for various reaction times, as described in Example 2.

In samples buffered at pH 10, very rapid and complete TNT and ADNT degradation was observed with 10 mM (millimolar) (FIGS. 9 and 6) or 31.25 mM (millimolar) concentrations of dithionite. Whereas the concentrations of TNT in soil treated with the buffer only at pH 10 are shown in FIG. 10, the results of TNT contaminated soil samples treated with 31.25 mM dithionite as a buffered sulfur-based bulk reductant were below the analytical method detection limit and, therefore, are not shown in FIG. 10. FIG. 11 shows a comparison of ADNT concentrations for soils treated with 10 mM dithionite solutions that were buffered and not buffered. At both high and low concentrations of dithionite, the abiotic transformation of TNT and ADNTs at alkaline pH occurred more efficiently than the transformation occurring at acidic pH (unbuffered). The rates of degradation of TNT and ADNT products were rapid upon the initial dithionite application and then slowed after the initial two hours.

Figure 12:
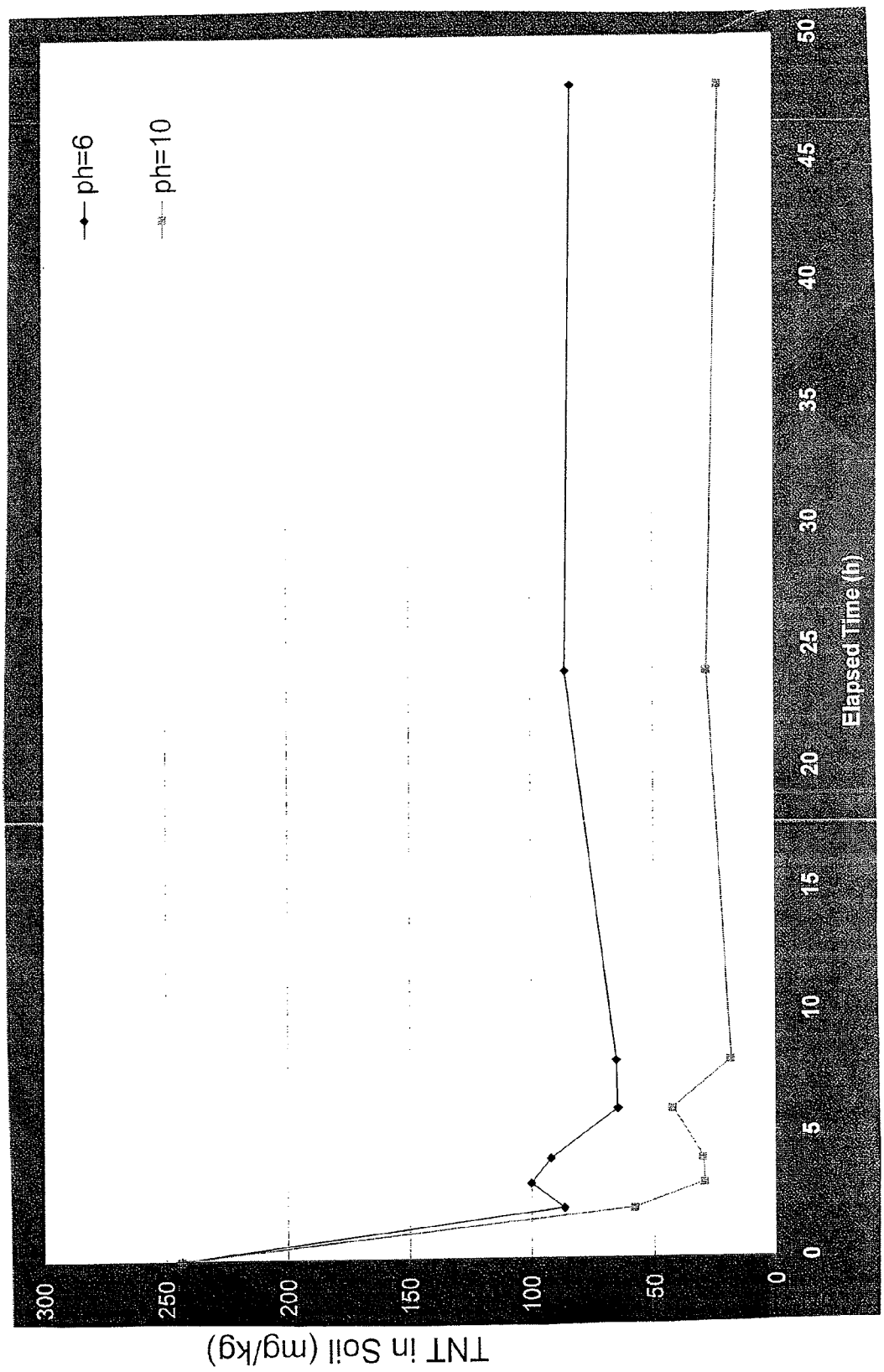
FIG. 12 shows a comparison of concentrations of TNT in soil treated with 0 mM dithionite in a buffered sulfur-based bulk reductant (pH=6) and an unbuffered sulfur-based bulk reductant (pH=10) for various reaction times, as described in Example 2.

TNT transformation occurred through the addition of only buffered, deionized water (FIGS. 10 and 12), suggesting alkaline degradation and/or base hydrolysis may be effective in TNT removal from aqueous and solid phases. Although not wanting to be bound by theory, it is believed cleavage of the toluene ring structure occurred, which would result in reduced concentrations of TNT and ADNTs.

Color changes of the dithionite-treated soils may be a qualitative measure of success of treatment. The majority of available ferric iron may be reduced to ferrous iron, leading to increased reduction capacity and reactive sites.

Example 3

Packed Column Experiments

Three packed column experiments were conducted to simulate the application of dithionite treatment at the field scale. Three types of treatments were conducted: (1) dithionite treatment of buffered explosives-contaminated soil; (2) dithionite treatment of unbuffered explosives-contaminated soil; and (3) control experiments consisting of explosives-contaminated soil treated with only deionized water.

Each column contained approximately 300 g (grams) of homogenized explosives-contaminated soil placed in glass columns, each having a length of 30 centimeters. The packed columns were wrapped in opaque paper to minimize photodegradation of TNT in the soils. The treatment of each soil column consisted of adding by gravity feed either deionized water (control) or unbuffered or buffered 31.25 mM (millimolar) dithionite solution at the column top and progressively infiltrating the reagent solution to the bottom of the column. The addition of reagent solution was terminated when the soil at the bottom of the column was visibly wet. The reagent solution at the top of each column was covered with wax paper to minimize reaction between atmospheric oxygen and the dithionite solution. A picture was taken at hourly intervals, when possible.

The reducing front created by the reaction between dithionite and the redox-sensitive metals was monitored visually at 10-15 minutes, one hour, 2 hours, 3 hours, and 5 hours. The reducing front observed was a distinct dark gray color change in the top portion of the column. The treated soil columns were sampled within the top (gray portion), middle, and bottom of the column. The composite samples taken from each depth (top, middle and bottom) were thoroughly mixed prior to extraction and analysis. Since there were no visible changes in the control column soil, only two composite samples were collected from the top and bottom of the column, within the top and bottom ten centimeters (10 cm), respectively. Each sample was analyzed by GC/μECD (gas chromatography with microelectron capture detection) according to EPA Method 8095 and the analysis was confirmed using high performance liquid chromatography (HPLC) according to EPA Method 8330. The results indicated the concentrations of TNT and ADNT isomers. However, the method lacked resolution for DANT isomers and triaminotoluene (TAT).

Samples taken from the top, middle, and bottom of the columns were analyzed for mineralogical changes by x-ray diffraction and capillary GC/MS.

X-Ray Diffraction Sample Preparation

The bulk slides of each mineral and aquifer material were prepared and analyzed by x-ray diffraction (XRD). Each of the bulk slide samples was prepared by placing one gram (1 g) of ground material into a vessel containing corundum beads and 10 mL (milliliters) of alcohol. The vessel was placed on a shaker for five minutes to grind the material to a particle size of less than 5 μm (micrometers). The material was then poured onto a glass dish and placed in a 60° C. oven to evaporate the alcohol. Upon drying, the material was then mildly powdered with a mortar and pestle. The powdered material was then placed in a square metal mold secured to a frosted glass plate and compressed into the mold using a hydraulic press.

Dithionite-treated samples and untreated control samples were prepared in the following manner: In an argon-filled glove bag, the samples were vacuum filtered onto 0.45 μm (micrometer) Millipore filter paper. The filter paper samples were then trimmed to fit in the XRD sample holder to minimize the effects of the samples rising out of the focusing circle of the diffractometer. The samples were placed on a square plastic sample holder in the argon-filled bag. The samples were placed on desiccant and sealed in a plastic container. The samples were then transported to the XRD laboratory and analyzed.

Results of Packed Column Tests

The concentrations of TNT, 4-ADNT, and 2-ADNT for each of the solid samples from the packed columns are shown in Table 1.

TABLE 1

Results of Packed Column Tests (BDL means below detection limit)

| Column | Sample Location in Column | Concentration (mg/kg) of TNT | Concentration (mg/kg) of 4-ADNT | Concentration (mg/kg) of 2-ADNT |
|---|---|---|---|---|
| 1 (buffered) | Top | BDL | 0.203 | 0.230 |
| 1 (buffered) | Middle | 9.30 | 0.259 | 0.896 |
| 1 (buffered) | Bottom | 47.78 | 0.0886 | 1.23 |
| 2 (unbuffered) | Top | 16.12 | 0.664 | 0.349 |
| 2 (unbuffered) | Middle | 336.19 | 1.940 | 1.597 |
| 2 (unbuffered) | Bottom | 320.15 | 1.76 | 1.68 |
| 3 (control) | Top | 271.33 | 7.76 | 5.94 |
| 3 (control) | Bottom | 235.186 | 6.76 | 5.39 |

The change in color of the dithionite-treated soils showed that the reducing front was more rapidly mobilized in the buffered treatments than in the unbuffered treatments. Similarly, the concentration of TNT and DNTs was below the detection limit (BDL) in the top ten centimeters (10 cm) of the buffered dithionite-treated soil column compared to 16 mg/kg (milligram per kilogram) in the top section of the unbuffered dithionite-treated soil column, and greater than 200 mg/kg (milligram per kilogram) in the top section of the water-treated control sample. Each of the DNTs was above 5 mg/kg (milligram per kilogram) in the top layer of the control column, but below 1 mg/kg (milligram per kilogram) in the unbuffered and buffered dithionite-treated columns. The amount of TNT and DNTs remaining in the middle and bottom of the unbuffered and buffered dithionite-treated soil columns was progressively higher, suggesting that the reaction was not complete at greater depths after the 24-hour reaction time. Comparison of the results of control, unbuffered, and buffered dithionite-treated soil columns provided evidence inconsistent with explosives being leached.

Results of GC/MS Analysis

Seven soil samples were subjected to munitions analysis and LC/MS identification of uncalibrated components. One gram (1 g) of each sample was extracted with 20 mL (milliliters) of an 80:20 mixture (by volume) of acetone and water for one hour on a wrist-action shaker, centrifuged, and 2 mL (milliliters) filtered through a 0.20 μm (micrometer) nylon filter into an autosampler vial. A surrogate (4-nitrobenzamide) was added to each sample. The extracts were analyzed on a Finnigan LCQ LC/MS using a Luna C-8 column with a gradient mobile phase of water and methanol. The flow rate was 0.3 mL/min (milliliters per minute) at a column temperature of 31° C. The MS was operated in the negative ion mode using atmospheric pressure chemical ionization (APCI) and had been tuned using trinitrobenzene (TNB).

The results of the LC/MS analysis are shown in Table 2.

TABLE 2

Total Ion Chromatogram Data

| Column | Sample Location | Retention Time (minutes) |
|---|---|---|
| 1 (buffered) | Top | No peak |
| 1 (buffered) | Middle | No peak |
| 1 (buffered) | Bottom | 13.94 |
| 2 (unbuffered) | Top | 13.67 |
| 2 (unbuffered) | Middle | 13.77 |
| 2 (unbuffered) | Bottom | 13.88 |
| Raw untreated soil | n/a | 13.42 |

The total ion chromatograms (TICs) for the seven extracts were similar except for the intensity of TNT observed at a retention time of approximately 13.5 minutes. The differences in the retention times of TNT between the different samples were most likely due to column equilibration over the analysis run.

Except for the samples from the top and middle sections of the buffered column, each sample displayed a chromatographic peak for TNT (m/z=227, $[M]^-$). Ions for two possible isomeric hydroxyamino-dinitrotoluenes (m/s=212, $[M-H]^-$) and the two isomeric dinitrotoluenes (m/z=182, $[M]^-$), which were expected transformation products of TNT, were not observed in any of the samples. Also, other than a chromatographic peak for TNT observed in all but the top and middle sections of the buffered column, UV analysis ($\lambda$=254 nanometers) of the extracts did not show any chromatographic peaks after a large solvent (acetone) peak at 4.5 minutes.

Example 4

Treatment of Sandy-Silt Soil

A sample of soil was obtained from a field site contaminated with TNT, RDX, and picric acid. The soil in this field site was a silty-sand soil. The sample was 255 grams of soil, which was packed into a column.

The soil was treated for 20 hours with 9 grams of buffered sulfur-based bulk reductant. The buffered sulfur-based bulk redunctant was a mixture of sodium dithionite and potassium carbonate/potassium bicarbonate buffer, wherein the weight ratio of sodium dithionite to buffers was 1:4, and the weight ratio of potassium carbonate to potassium bicarbonate was 10:1. Water was then added to saturate the sample. The treatment duration was 20 hours. Samples of the treated soil were obtained from the top layer of the column and the bottom layer of the column. Each of the top and bottom layers was analyzed for concentrations of TNT, RDX, and picric acid.

The treatment of the soil sample resulted in significant reduction of each of the contaminants. Table 3 shows the results of the treatment.

TABLE 3

| | TNT Concentration (mg/kg) | RDX Concentration (mg/kg) | Picric Acid Concentration (mg/kg) |
|---|---|---|---|
| Initial Concentration | 11.1 | 16.8 | 0.52 |
| Top Layer | 1.47 | 0.196 | BDL |
| Bottom Layer | 0.232 | 0.367 | BDL |

Example 5

Results of the column tests in Example 4 were confirmed by treatment of samples of soil from the same site as Example 4 in batch experiments. Initially, the soils were spiked with picric acid, RDX, TNT, and HMX to obtain a soil having higher concentrations of nitroaromatics in the same type of soil. In the batch tests, 75 grams of contaminated silty clay soil was treated in each vial. Three tests were conducted: a control (treatment with DI water), a sample with 2 wt-% sulfur-based bulk reductant (containing 1.5 grams of sodium dithionite, 3 grams of calcium carbonate; the weight ratio of buffered bulk reductant to soil was approximately 1:17), and a sample with 4 wt-% sulfur-based bulk reductant (containing 3 grams of sodium dithionite, 5 grams of calcium carbonate; the weight ratio of buffered bulk reductant to soil was approximately 1:9). For all samples, water was added to saturate the soil samples. Each of the treated soils from these tests was analyzed for the concentrations of contaminants of concern and degradation products. The results are provided in Table 4.

TABLE 4

| Type | Picric Acid Conc. (mg/kg) | 1,3,5-TNB Conc. (mg/kg) | 2,4,6-TNT Conc. (mg/kg) | 4A-2,6-DNT Conc. (mg/kg) | HMX Conc. (mg/kg) | RDX Conc. (mg/kg) |
|---|---|---|---|---|---|---|
| Control | 1100 | 1.0 | 170 | 1.6 | 490 | 250 |
| 2 wt-% Bulk Reductant | ND | ND | 4.2* | 0.73* | 380 | 220 |
| 4 wt-% Bulk Reductant | ND | ND | 0.98* | ND | 400 | 88 |

(Asterisks indicate that the values were close to the instrument/method detection limit; ND means not detected.)

The results of the batch tests indicated the order of reactivity in these systems. The most reactive was picric acid, followed by TNT, then RDX, and then HMX.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A remediation method for removing contaminants from and/or degrading contaminants in soil and/or water, the method comprising contacting a sulfur-based bulk reductant comprising a dithionite reducing agent and one or more buffers with a composition in the absence of additional oxidized metal compounds, the composition comprising:
   contaminants comprising one or more oxidized organic compounds; and
   soil and/or water,
wherein the one or more oxidized organic compounds are degraded.

2. The method of claim 1 wherein contacting is in situ or ex situ.

3. The method of claim 1 wherein the method is abiotic.

4. The method of claim 1 wherein the one or more oxidized organic compounds are energetic compounds and/or explosives that comprise one or more aliphatic or aromatic compounds comprising one or more nitro groups.

5. The method of claim 1 wherein the one or more oxidized organic compounds are selected from the group consisting of octahydro-1,3,5,7-tetranitro-1,3,5,7-tetrazocine (HMX), 2,4,6-trinitrotoluene (TNT), 1,3,5-trinitro-1,3,5-triazine (RDX), trinitrobenzenes (TNB), nitrobenzene, nitrocellulose, nitroglycerin, nitromethane, aminodinitrotoluenes (ADNTs), diaminonitrotoluenes (DANTs), 2,4,6-trinitrophenol (TNP), triamino-trinitrobenzene (TATNB), dinitrotoluenes (DNTs), 2,4,6-trinitrophenyl-N-methylnitramine, and combinations thereof.

6. The method of claim 1 wherein the contacting results in the one or more oxidized organic compounds being substantially mineralized.

7. The method of claim 1 wherein the sulfur-based bulk reductant is an alkaline, aqueous solution, suspension, and/or dispersion of a sulfur-based reducing agent.

8. The method of claim 1 wherein the sulfur-based bulk reductant comprises dithionite at a concentration of at least 50 mM.

9. The method of claim 1 wherein contacting comprises applying the sulfur-based bulk reductant to a surface of the composition and allowing the sulfur-based bulk reductant to absorb into the composition.

10. The method of claim 1 wherein contacting comprises mixing the composition and the sulfur-based bulk reductant with an auger.

11. The method of claim 1 wherein the sulfur-based bulk reductant comprises a solid.

12. The method of claim 11 wherein contacting further comprises adding water to the solid.

13. The method of claim 11 wherein the solid comprises a controlled-release agent.

14. The method of claim 11 wherein contacting comprises placing the solid in a fluid that is contacting at least one unexploded ordnance.

15. The method of claim 14 wherein the at least one unexploded ordnance is an underwater unexploded ordnance.

16. The method of claim 14 wherein the fluid is salt water.

17. The method of claim 1 wherein the composition comprises soil at a treatment site and the contacting comprises applying the sulfur-based bulk reductant to the soil at the treatment site.

18. The method of claim 17 wherein applying comprises spraying the sulfur-based bulk reductant.

19. The method of claim 18 wherein applying comprises mixing the sulfur-based bulk reductant and the soil.

20. A remediation method for removing contaminants from and/or degrading contaminants in soil and/or water, the method comprising contacting a sulfur-based bulk reductant comprising a dithionite reducing agent and one or more buffers with a composition in the absence of additional oxidized metal compounds, the composition comprising:
   one or more chlorinated organic compounds; and
   soil and/or water,
wherein the one or more chlorinated organic compounds are degraded.

21. The method of claim 20 wherein one or more chlorinated organic compounds comprise one or more polychlorinated biphenyl compounds.

22. A remediation method for removing contaminants from and/or degrading contaminants in soil and/or water, the method comprising contacting a sulfur-based bulk reductant comprising a dithionite reducing agent and one or more buffers with a composition in the absence of additional oxidized metal compounds, the composition comprising:

one or more chemical warfare agents; and soil and/or water, wherein the one or more chemical warfare agents are degraded.

23. The method of claim 22 wherein the one or more chemical warfare agents comprise one or more nerve agents, blister agents, and/or pulmonary agents.

24. A remediation method for removing contaminants from and/or degrading contaminants in soil and/or water, the method comprising contacting a sulfur-based bulk reductant comprising a dithionite reducing agent and one or more buffers with a composition in the absence of additional oxidized metal compounds under conditions effective for abiotic, free-radical mediated reduction, wherein the composition comprises:

contaminants comprising one or more oxidized organic compounds; and soil and/or water, wherein the one or more oxidized organic compounds are degraded.

25. The method of claim 24 wherein conditions effective for abiotic, free-radical mediated reduction comprise a pH of at least 7.

26. The method of claim 24 wherein conditions effective for abiotic, free-radical mediated reduction comprise the absence of oxygen.

27. A remediation method for removing contaminants from and/or degrading contaminants in a composition, the method comprising:

providing a sulfur-based bulk reductant consisting essentially of a dithionite reducing agent, one or more buffers, and water; and contacting the sulfur-based bulk reductant with the composition, wherein the contaminants comprise one or more oxidized organic compounds, and wherein the one or more oxidized organic compounds are degraded.

28. The remediation method of claim 27 wherein the sulfur-based bulk reductant consists of a dithionite reducing agent, one or more buffers, and water.

29. The method of claim 27 wherein contacting comprises conditions effective for abiotic, free-radical mediated reduction.

30. A remediation method for removing contaminants from and/or degrading contaminants in a composition, the method comprising:

providing a sulfur-based bulk reductant consisting essentially of a dithionite reducing agent, one or more buffers, and water; and contacting the sulfur-based bulk reductant with the composition, wherein the contaminants comprise one or more chlorinated organic compounds, and wherein the one or more chlorinated organic compounds are degraded.

31. The remediation method of claim 30 wherein the sulfur-based bulk reductant consists of a reducing agent, one or more buffers, and water.

32. A remediation method for removing contaminants from and/or degrading contaminants in a composition, the method comprising:

providing a sulfur-based bulk reductant consisting essentially of a dithionite reducing agent, one or more buffers, and water; and contacting the sulfur-based bulk reductant with the composition, wherein the contaminants comprise one or more chemical warfare agents, and wherein the one or more chemical warfare agents are degraded.

33. The remediation method of claim 32 wherein the sulfur-based bulk reductant consists of a dithionite reducing agent, one or more buffers, and water.

* * * * *

UNITED STATES PATENT AND TRADEMARK OFFICE
CERTIFICATE OF CORRECTION

PATENT NO. : 8,722,957 B2  Page 1 of 1
APPLICATION NO. : 12/599098
DATED : May 13, 2014
INVENTOR(S) : Valentine A. Nzengung It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Twenty-ninth Day of September, 2015

Michelle K. Lee
*Director of the United States Patent and Trademark Office*